(12) United States Patent
Tanaka

(10) Patent No.: US 11,346,854 B2
(45) Date of Patent: May 31, 2022

(54) PHYSICAL QUANTITY SENSOR, ELECTRONIC APPARATUS, AND VEHICLE

(71) Applicant: SEIKO EPSON CORPORATION, Tokyo (JP)

(72) Inventor: Satoru Tanaka, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/075,845

(22) Filed: Oct. 21, 2020

(65) Prior Publication Data

US 2021/0123944 A1 Apr. 29, 2021

(30) Foreign Application Priority Data

Oct. 23, 2019 (JP) .............................. JP2019-192806

(51) Int. Cl.
| | | |
|---|---|---|
| *G01P 15/18* | (2013.01) | |
| *G01P 15/08* | (2006.01) | |
| *B60R 21/0132* | (2006.01) | |
| *G01P 15/125* | (2006.01) | |

(52) U.S. Cl.
CPC .......... *G01P 15/0802* (2013.01); *G01P 15/18* (2013.01); *B60R 21/0132* (2013.01); *G01P 15/125* (2013.01)

(58) Field of Classification Search
CPC .... G01P 15/0802; G01P 15/18; G01P 15/125; G01P 2015/0882; B60R 21/0132
See application file for complete search history.

(56) References Cited

U.S. PATENT DOCUMENTS

| | | | | |
|---|---|---|---|---|
| 4,574,327 | A * | 3/1986 | Wilner ................. | G01D 5/2417 361/283.4 |
| 4,825,335 | A * | 4/1989 | Wilner .................. | G01P 15/125 29/25.42 |
| 5,350,189 | A * | 9/1994 | Tsuchitani .............. | G01P 1/003 180/282 |
| 5,353,641 | A * | 10/1994 | Tang ..................... | G01P 15/125 73/514.18 |
| 5,404,749 | A * | 4/1995 | Spangler ................ | G01P 1/003 73/514.29 |
| 5,488,864 | A * | 2/1996 | Stephan ................ | G01P 15/125 73/514.32 |
| 5,495,414 | A * | 2/1996 | Spangler ............. | B60R 21/0132 180/282 |

(Continued)

FOREIGN PATENT DOCUMENTS

| | | |
|---|---|---|
| JP | 2003-519384 | 6/2003 |
| JP | 2004-531714 | 10/2004 |
| JP | 2019-184261 | 10/2019 |

*Primary Examiner* — David J Bolduc
(74) *Attorney, Agent, or Firm* — Rankin, Hill & Clark LLP

(57) ABSTRACT

A physical quantity sensor includes a substrate, and a moving member facing the substrate in a third direction via a gap and becoming displaced in the third direction in relation to the substrate. The moving member has a first part and a second part, and a plurality of penetration holes arranged at the first part and the second part and penetrating the moving member in the third direction. In at least one of a first area overlapping the first part and a second area overlapping the second part, as viewed in a plan view from the third direction, $C \leq 1.5 \times C_{min}$ is satisfied, where C is a damping and $C_{min}$ is a minimum value of the damping.

15 Claims, 37 Drawing Sheets

(56) References Cited

U.S. PATENT DOCUMENTS

| | | | | |
|---|---|---|---|---|
| 5,576,250 | A * | 11/1996 | Diem | B81B 3/0051 257/254 |
| 6,035,714 | A * | 3/2000 | Yazdi | G01P 15/0802 73/514.32 |
| 6,082,197 | A * | 7/2000 | Mizuno | G01P 15/0802 73/514.32 |
| 6,167,757 | B1 * | 1/2001 | Yazdi | G01P 15/125 73/514.32 |
| 6,230,566 | B1 * | 5/2001 | Lee | G01P 15/125 73/514.32 |
| 7,146,856 | B2 * | 12/2006 | Malametz | G01P 15/0802 73/514.32 |
| 8,079,262 | B2 * | 12/2011 | Guo | G01P 15/125 73/514.32 |
| 8,171,793 | B2 * | 5/2012 | Foster | G01P 15/125 73/514.32 |
| 8,614,110 | B1 * | 12/2013 | Waters | G01P 15/0802 438/50 |
| 10,317,425 | B2 * | 6/2019 | Tanaka | B81B 3/0016 |
| 10,663,480 | B2 * | 5/2020 | Tanaka | G01P 15/18 |
| 10,788,510 | B2 * | 9/2020 | Tanaka | G01P 15/0802 |
| 10,850,975 | B2 * | 12/2020 | Tanaka | B60R 16/0231 |
| 2001/0042404 | A1 * | 11/2001 | Yazdi | G01P 15/0802 73/504.12 |
| 2002/0104379 | A1 * | 8/2002 | Ried | G01V 1/181 73/514.32 |
| 2002/0189350 | A1 * | 12/2002 | Tu | G01P 15/0802 73/504.04 |
| 2003/0115960 | A1 | 6/2003 | Franz et al. | |
| 2004/0129077 | A1 | 7/2004 | Franz et al. | |
| 2004/0160232 | A1 * | 8/2004 | Yue | G01P 15/131 324/660 |
| 2004/0239341 | A1 * | 12/2004 | Aoyagi | G01P 15/125 324/661 |
| 2005/0109109 | A1 * | 5/2005 | Eskridge | G01P 15/0802 73/514.32 |
| 2006/0169043 | A1 | 8/2006 | McNeil | |
| 2006/0277997 | A1 * | 12/2006 | Foster | G01P 15/18 73/514.32 |
| 2008/0282802 | A1 * | 11/2008 | Pike | G01P 15/08 73/514.32 |
| 2010/0024553 | A1 * | 2/2010 | Classen | G01P 15/0802 73/514.32 |
| 2010/0122578 | A1 * | 5/2010 | Classen | G01P 15/125 73/514.32 |
| 2010/0223998 | A1 * | 9/2010 | Ackerley | G01V 1/181 73/514.32 |
| 2012/0031185 | A1 | 2/2012 | Classen et al. | |
| 2012/0204642 | A1 * | 8/2012 | McNeil | B81B 7/02 73/514.32 |
| 2013/0042684 | A1 * | 2/2013 | Yoda | G01P 15/125 73/514.01 |
| 2013/0263662 | A1 * | 10/2013 | Tanaka | G01P 1/003 73/504.12 |
| 2014/0260612 | A1 * | 9/2014 | Aono | G01C 19/5705 73/504.12 |
| 2015/0177273 | A1 | 6/2015 | Cheng et al. | |
| 2015/0316582 | A1 * | 11/2015 | Tanaka | G01P 15/125 73/514.32 |
| 2019/0062149 | A1 * | 2/2019 | Tanaka | B81B 3/0072 |
| 2019/0064201 | A1 * | 2/2019 | Tanaka | G01C 19/5628 |
| 2019/0101566 | A1 * | 4/2019 | Inaba | G01C 19/5628 |
| 2019/0302142 | A1 | 10/2019 | Tanaka | |
| 2020/0064368 | A1 * | 2/2020 | Nagata | G01P 15/125 |
| 2020/0309814 | A1 * | 10/2020 | Takizawa | G01P 15/125 |
| 2020/0400713 | A1 * | 12/2020 | Tanaka | G01C 19/5712 |
| 2020/0408802 | A1 * | 12/2020 | Tanaka | G01P 15/125 |
| 2020/0409367 | A1 * | 12/2020 | Tanaka | G05D 1/021 |

* cited by examiner

PHYSICAL QUANTITY SENSOR, ELECTRONIC APPARATUS, AND VEHICLE

The present application is based on, and claims priority from JP Application Serial Number 2019-192806, filed Oct. 23, 2019, the disclosure of which is hereby incorporated by reference herein in its entirety.

BACKGROUND

1. Technical Field

The present disclosure relates to a physical quantity sensor, an electronic apparatus, and a vehicle.

2. Related Art

For example, an acceleration sensor described in JP-T-2003-519384 has a substrate, a fixed part fixed to the substrate, a moving member coupled to the fixed part via a beam, and a fixed detection electrode arranged at the substrate and detecting an electrostatic capacitance generated between the moving member and the fixed detection electrode. When an acceleration is applied from a direction in which the moving member and the fixed detection electrode overlap each other, the moving member swings about the beam as an axis of rotation. With this swing, the space between the moving member and the fixed detection electrode changes and therefore the electrostatic capacitance changes. Thus, the acceleration sensor described in JP-T-2003-519384 can detect an acceleration, based on a change in the electrostatic capacitance.

However, the acceleration sensor described in JP-T-2003-519384 has a problem in that the sensitivity of detecting an acceleration drops because of a reduction in the electrostatic capacitance generated between the moving member and the fixed detection electrode due to a penetration hole formed in the moving member and because of air resistance generated when the moving member swings.

SUMMARY

A physical quantity sensor according to an aspect of the present disclosure, where a first direction, a second direction, and a third direction are provided as three directions orthogonal to each other, includes: a substrate; and a moving member facing the substrate in the third direction via a gap and becoming displaced in the third direction in relation to the substrate. The gap has a first gap and a second gap having a longer distance between the substrate and the moving member than the first gap. The moving member has a first part overlapping the first gap and a second part overlapping the second gap, as viewed in a plan view from the third direction, and a plurality of penetration holes arranged at the first part and the second part, penetrating the moving member in the third direction, and having a square opening shape as viewed from the third direction. In at least one of a first area overlapping the first part and a second area overlapping the second part, as viewed in a plan view from the third direction, $C \leq 1.5 \times C$ min, provided that $$C = 2aL\frac{8\mu H}{\beta^2 r_0^2}\left(1 + \frac{3r_0^4 K(\beta)}{16Hh^3}\right)\left[1 - \frac{l}{a}\tanh\left(\frac{a}{l}\right)\right] \quad (1)$$

$$l = \sqrt{\frac{2h^3 H_{\mathit{eff}} \eta(\beta)}{3\beta^2 r_0^2}}$$

$$H_{\mathit{eff}} = H + \frac{3\pi r_0}{8}$$

$$\eta(\beta) = 1 + \frac{3r_0^4 K(\beta)}{16Hh^3}$$

$$K(\beta) = 4\beta^2 - \beta^4 - 4\ln\beta - 3$$

$$\beta = \frac{r_0}{r_c}$$

$$r_c = \frac{S0 + S1}{\sqrt{\pi}}$$

$$r_0 = 0.547 \times S0.$$

In the above, H is a length of the penetration hole in the third direction, a is half a length of the moving member along the first direction, L is a length of the moving member along the second direction, h is a length of the gap in the third direction, S0 is a length of one side of the penetration hole, S1 is a space between the penetration holes next to each other, μ is a viscous resistance of a gas in the gap, and C is a damping generated in the moving member. C in the formula (1) is defined as Cmin when satisfying $$\frac{3r_0^4 K(\beta)}{16Hh^3} = 1.$$

A physical quantity sensor according to another aspect of the present disclosure, where a first direction, a second direction, and a third direction are provided as three directions orthogonal to each other, includes: a substrate; and a moving member facing the substrate in the third direction via a gap and becoming displaced in the third direction in relation to the substrate. The gap has a first gap and a second gap having a longer distance between the substrate and the moving member than the first gap. The moving member has a first part overlapping the first gap and a second part overlapping the second gap, as viewed in a plan view from the third direction, and a plurality of penetration holes arranged at the first part and the second part, penetrating the moving member in the third direction, and having a circular opening shape as viewed from the third direction. In at least one of a first area overlapping the first part and a second area overlapping the second part, as viewed in a plan view from the third direction, $C \leq 1.5 \times C$ min, provided that $$C = 2aL\frac{8\mu H}{\beta^2 r_0^2}\left(1 + \frac{3r_0^4 K(\beta)}{16Hh^3}\right)\left[1 - \frac{l}{a}\tanh\left(\frac{a}{l}\right)\right] \quad (1)$$

$$l = \sqrt{\frac{2h^3 H_{\mathit{eff}} \eta(\beta)}{3\beta^2 r_0^2}}$$

$$H_{\mathit{eff}} = H + \frac{3\pi r_0}{8}$$

$$\eta(\beta) = 1 + \frac{3r_0^4 K(\beta)}{16Hh^3}$$

$$K(\beta) = 4\beta^2 - \beta^4 - 4\ln\beta - 3$$

$$\beta = \frac{r_0}{r_c}.$$

In the above, H is a length of the penetration hole in the third direction, a is half a length of the moving member along the first direction, L is a length of the moving member along the second direction, h is a length of the gap in the third direction, $r_0$ is a radius of the penetration hole, $r_c$ is half a distance between centers of the penetration holes, μ is a viscous resistance of a gas in the gap, and C is a damping generated in the moving member. C in the formula (1) is defined as Cmin when satisfying $$\frac{3r_0^4 K(\beta)}{16Hh^3} = 1.$$

A physical quantity sensor according to still another aspect of the present disclosure, where a first direction, a second direction, and a third direction are provided as three directions orthogonal to each other, includes: a substrate; and a moving member facing the substrate in the third direction via a gap and becoming displaced in the third direction in relation to the substrate. The gap has a first gap and a second gap having a longer distance between the substrate and the moving member than the first gap. The moving member has a first part overlapping the first gap and a second part overlapping the second gap, as viewed in a plan view from the third direction, and a plurality of penetration holes arranged at the first part and the second part, penetrating the moving member in the third direction, and having a polygonal opening shape as viewed from the third direction. In at least one of a first area overlapping the first part and a second area overlapping the second part, as viewed in a plan view from the third direction, $C \leq 1.5 \times C$ min, provided that $$C = 2aL\frac{8\mu H}{\beta^2 r_0^2}\left(1 + \frac{3r_0^4 K(\beta)}{16Hh^3}\right)\left[1 - \frac{l}{a}\tanh\left(\frac{a}{l}\right)\right] \quad (1)$$

$$l = \sqrt{\frac{2h^3 H_{eff} \eta(\beta)}{3\beta^2 r_0^2}}$$

$$H_{eff} = H + \frac{3\pi r_0}{8}$$

$$\eta(\beta) = 1 + \frac{3r_0^4 K(\beta)}{16Hh^3}$$

$$K(\beta) = 4\beta^2 - \beta^4 - 4\ln\beta - 3$$

$$\beta = \frac{r_0}{r_c}$$

$$r_c = \frac{S0 + S1}{\sqrt{\pi}}$$

$$r_0 = 0.547 \times S0.$$

In the above, H is a length of the penetration hole in the third direction, a is half a length of the moving member along the first direction, L is a length of the moving member along the second direction, h is a length of the gap in the third direction, S0 is a square root of area of the penetration hole, S1 is a value of spaces between the penetration holes next to each other in the first direction and the second direction added together and divided by 2, μ is a viscous resistance of a gas in the gap, and C is a damping generated in the moving member. C in the formula (1) is defined as Cmin when satisfying $$\frac{3r_0^4 K(\beta)}{16Hh^3} = 1.$$

A physical quantity sensor according to still another aspect of the present disclosure, where a first direction, a second direction, and a third direction are provided as three directions orthogonal to each other, includes: a substrate; and a moving member facing the substrate in the third direction via a gap and becoming displaced in the third direction in relation to the substrate. The moving member has a first part and a second part having a longer length in the third direction than the first part, and a plurality of penetration holes arranged at the first part and the second part, penetrating the moving member in the third direction, and having a square opening shape as viewed from the third direction. In at least one of a first area overlapping the first part and a second area overlapping the second part, as viewed in a plan view form the third direction, $C \leq 1.5 \times C$ min, provided that $$C = 2aL\frac{8\mu H}{\beta^2 r_0^2}\left(1 + \frac{3r_0^4 K(\beta)}{16Hh^3}\right)\left[1 - \frac{l}{a}\tanh\left(\frac{a}{l}\right)\right] \quad (2)$$

$$l = \sqrt{\frac{2h^3 H_{eff} \eta(\beta)}{3\beta^2 r_0^2}}$$

$$H_{eff} = H + \frac{3\pi r_0}{8}$$

$$\eta(\beta) = 1 + \frac{3r_0^4 K(\beta)}{16Hh^3}$$

$$K(\beta) = 4\beta^2 - \beta^4 - 4\ln\beta - 3$$

$$\beta = \frac{r_0}{r_c}$$

$$r_c = \frac{S0 + S1}{\sqrt{\pi}}$$

$$r_0 = 0.547 \times S0.$$

In the above, H is a length of the penetration hole in the third direction, a is half a length of the moving member along the first direction, L is a length of the moving member along the second direction, h is a length of the gap in the third direction, S0 is a length of one side of the penetration hole, S1 is a space between the penetration holes next to each other, μ is a viscous resistance of a gas in the gap, and C is a damping generated in the moving member. C in the formula (2) is defined as Cmin when satisfying $$\frac{3r_0^4 K(\beta)}{16Hh^3} = 1.$$

A physical quantity sensor according to still another aspect of the present disclosure, where a first direction, a second direction, and a third direction are provided as three directions orthogonal to each other, includes: a substrate; and a moving member facing the substrate in the third direction via a gap and becoming displaced in the third direction in relation to the substrate. The moving member has a first part and a second part having a longer length in the third direction than the first part, and a plurality of penetration holes arranged at the first part and the second part, penetrating the moving member in the third direction, and having a circular opening shape as viewed from the third direction. In at least one of a first area overlapping the first part and a second area overlapping the second part, as viewed in a plan view from the third direction, $C \leq 1.5 \times C$ min, provided that $$C = 2aL\frac{8\mu H}{\beta^2 r_0^2}\left(1 + \frac{3r_0^4 K(\beta)}{16Hh^3}\right)\left[1 - \frac{l}{a}\tanh\left(\frac{a}{l}\right)\right] \quad (1)$$

$$l = \sqrt{\frac{2h^3 H_{\mathit{eff}} \eta(\beta)}{3\beta^2 r_0^2}}$$

$$H_{\mathit{eff}} = H + \frac{3\pi r_0}{8}$$

$$\eta(\beta) = 1 + \frac{3r_0^4 K(\beta)}{16Hh^3}$$

$$K(\beta) = 4\beta^2 - \beta^4 - 4\ln\beta - 3$$

$$\beta = \frac{r_0}{r_c}.$$

In the above, H is a length of the penetration hole in the third direction, a is half a length of the moving member along the first direction, L is a length of the moving member along the second direction, h is a length of the gap in the third direction, $r_0$ is a radius of the penetration hole, $r_c$ is half a distance between centers of the penetration holes, μ is a viscous resistance of a gas in the gap, and C is a damping generated in the moving member. C in the formula (1) is defined as Cmin when satisfying $$\frac{3r_0^4 K(\beta)}{16Hh^3} = 1.$$

A physical quantity sensor according to still another aspect of the present disclosure, where a first direction, a second direction, and a third direction are provided as three directions orthogonal to each other, includes: a substrate; and a moving member facing the substrate in the third direction via a gap and becoming displaced in the third direction in relation to the substrate. The moving member has a first part and a second part having a longer length in the third direction than the first part, and a plurality of penetration holes arranged at the first part and the second part, penetrating the moving member in the third direction, and having a polygonal opening shape as viewed from the third direction. In at least one of a first area overlapping the first part and a second area overlapping the second part, as viewed in a plan view from the third direction, C≤1.5×C min, provided that $$C = 2aL\frac{8\mu H}{\beta^2 r_0^2}\left(1 + \frac{3r_0^4 K(\beta)}{16Hh^3}\right)\left[1 - \frac{l}{a}\tanh\left(\frac{a}{l}\right)\right] \quad (1)$$

$$l = \sqrt{\frac{2h^3 H_{\mathit{eff}} \eta(\beta)}{3\beta^2 r_0^2}}$$

$$H_{\mathit{eff}} = H + \frac{3\pi r_0}{8}$$

$$\eta(\beta) = 1 + \frac{3r_0^4 K(\beta)}{16Hh^3}$$

$$K(\beta) = 4\beta^2 - \beta^4 - 4\ln\beta - 3$$

$$\beta = \frac{r_0}{r_c}$$

$$r_c = \frac{S0 + S1}{\sqrt{\pi}}$$

$$r_0 = 0.547 \times S0.$$

In the above, H is a length of the penetration hole in the third direction, a is half a length of the moving member along the first direction, L is a length of the moving member along the second direction, h is a length of the gap in the third direction, S0 is a square root of area of the penetration hole, S1 is a value of spaces between the penetration holes next to each other in the first direction and the second direction added together and divided by 2, μ is a viscous resistance of a gas in the gap, and C is a damping generated in the moving member. C in the formula (1) is defined as Cmin when satisfying $$\frac{3r_0^4 K(\beta)}{16Hh^3} = 1.$$

DESCRIPTION OF EXEMPLARY EMBODIMENTS

A physical quantity sensor, an electronic apparatus, and a vehicle according to the present disclosure will now be described in detail, based on embodiments shown in the accompanying drawings.

First Embodiment

First, a physical quantity sensor according to a first embodiment of the present disclosure will be described.

Figure 1:
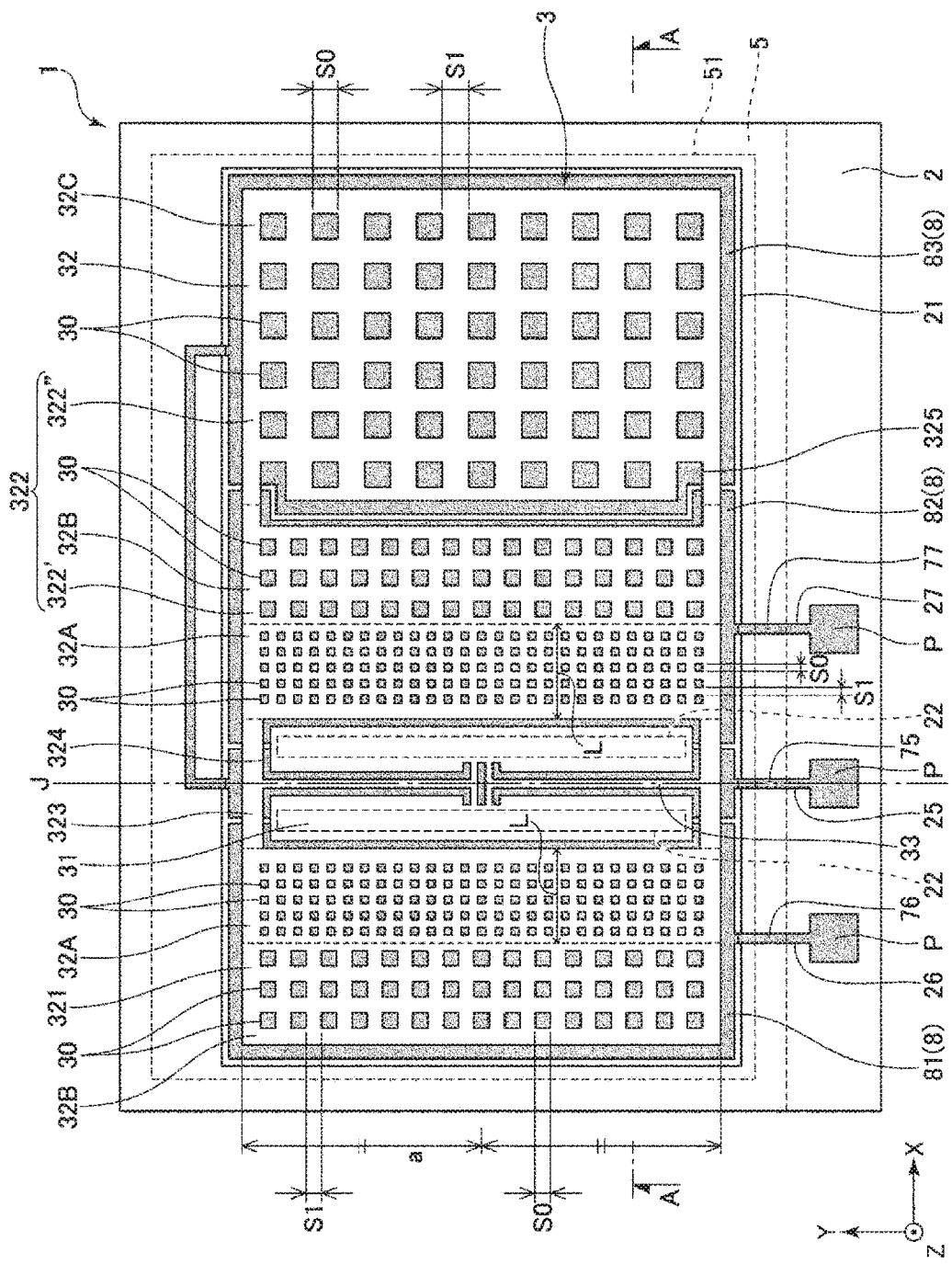
FIG. 1 is a plan view showing a physical quantity sensor according to a first embodiment of the present disclosure.
Figure 2:
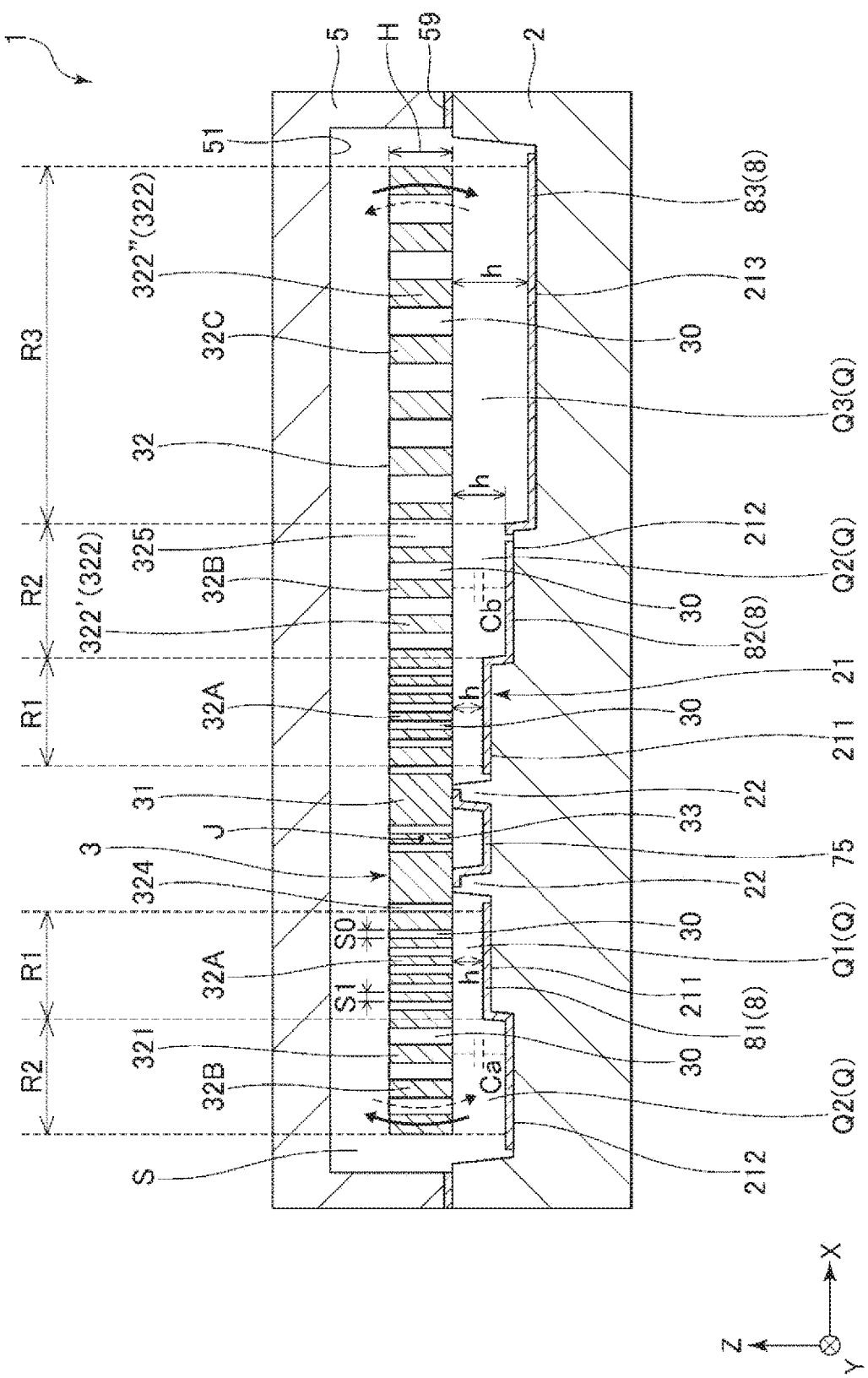
FIG. 2 is a cross-sectional view taken along A-A in FIG. 1.
Figure 3:
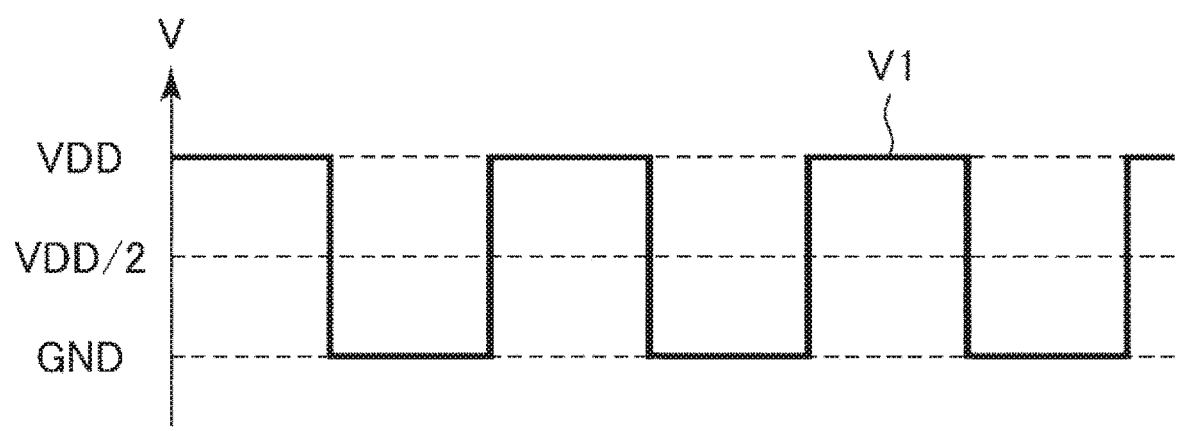
FIG. 3 shows a voltage applied to the physical quantity sensor shown in FIG. 1.
Figure 4:
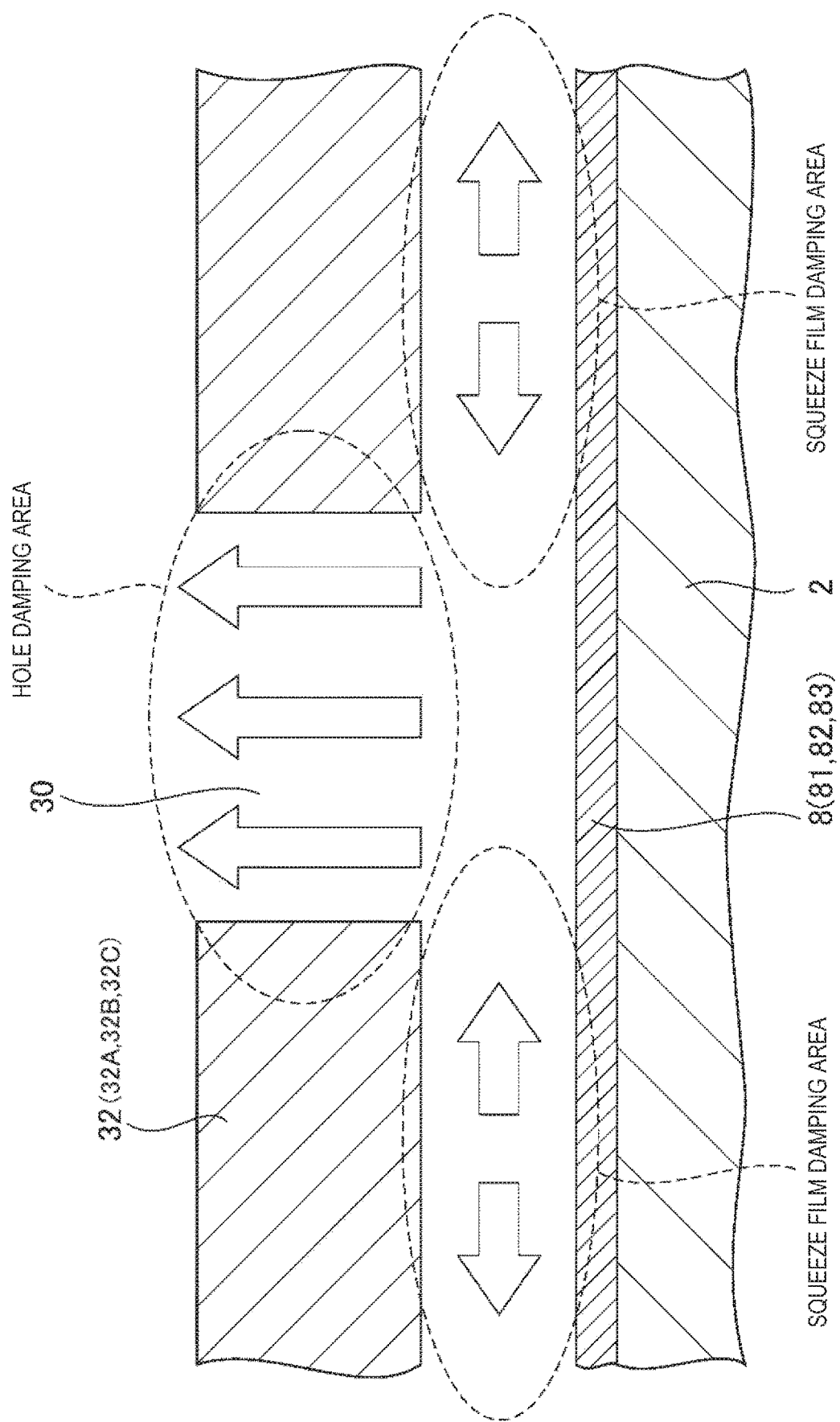
FIG. 4 is a schematic view for explaining damping.
Figure 5:
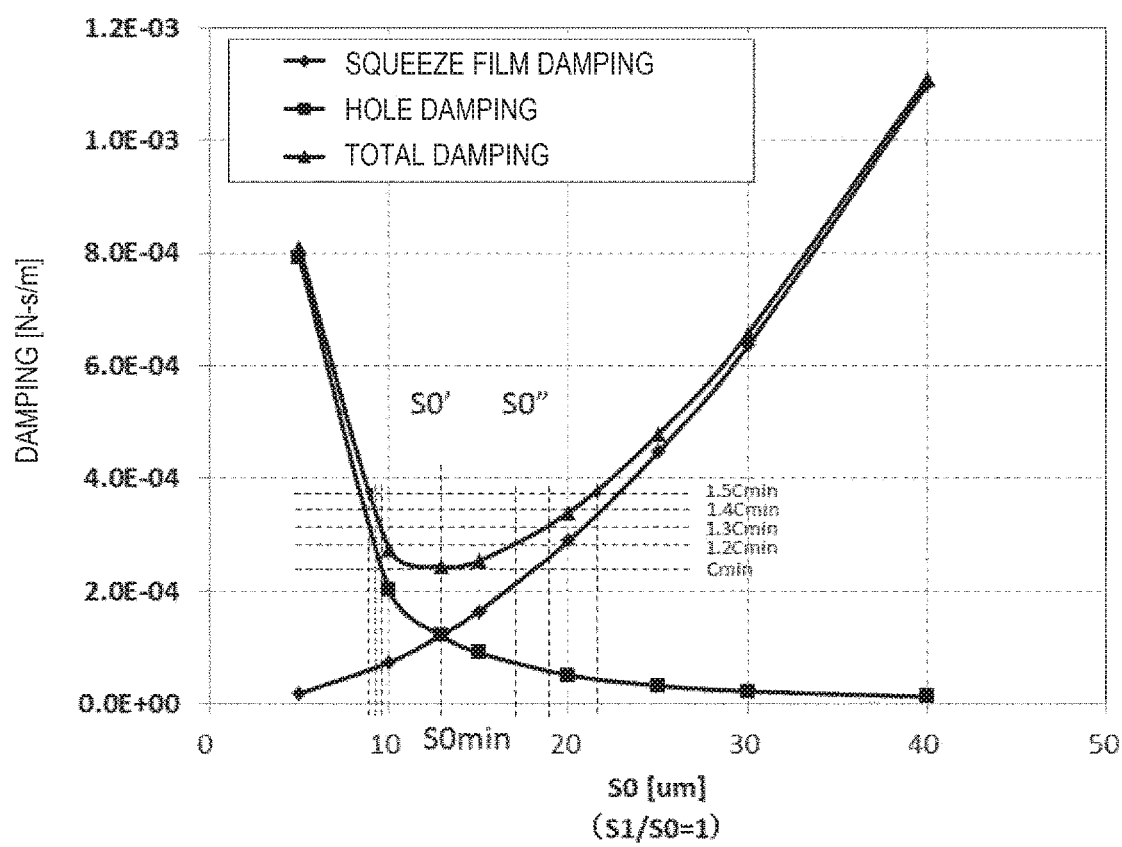
FIG. 5 is a graph showing the relationship between S0 and damping.
Figure 6:
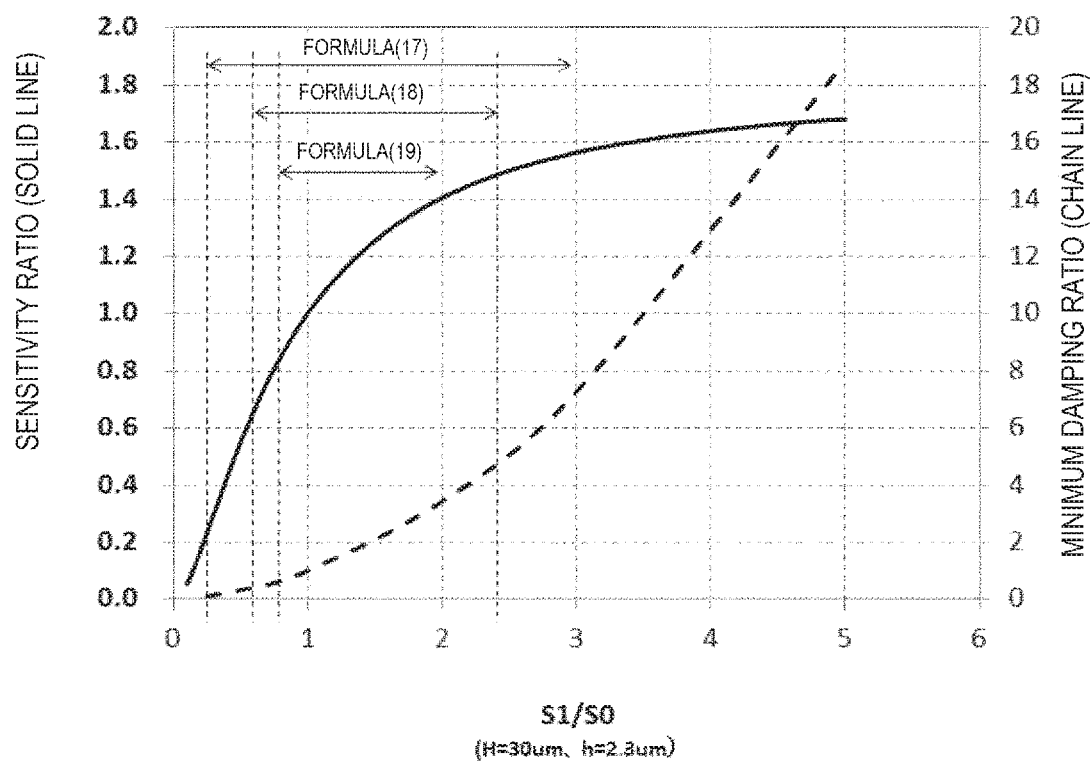
FIG. 6 is a graph showing the relationship between S1/S0, and sensitivity ratio and damping ratio.
Figure 7:
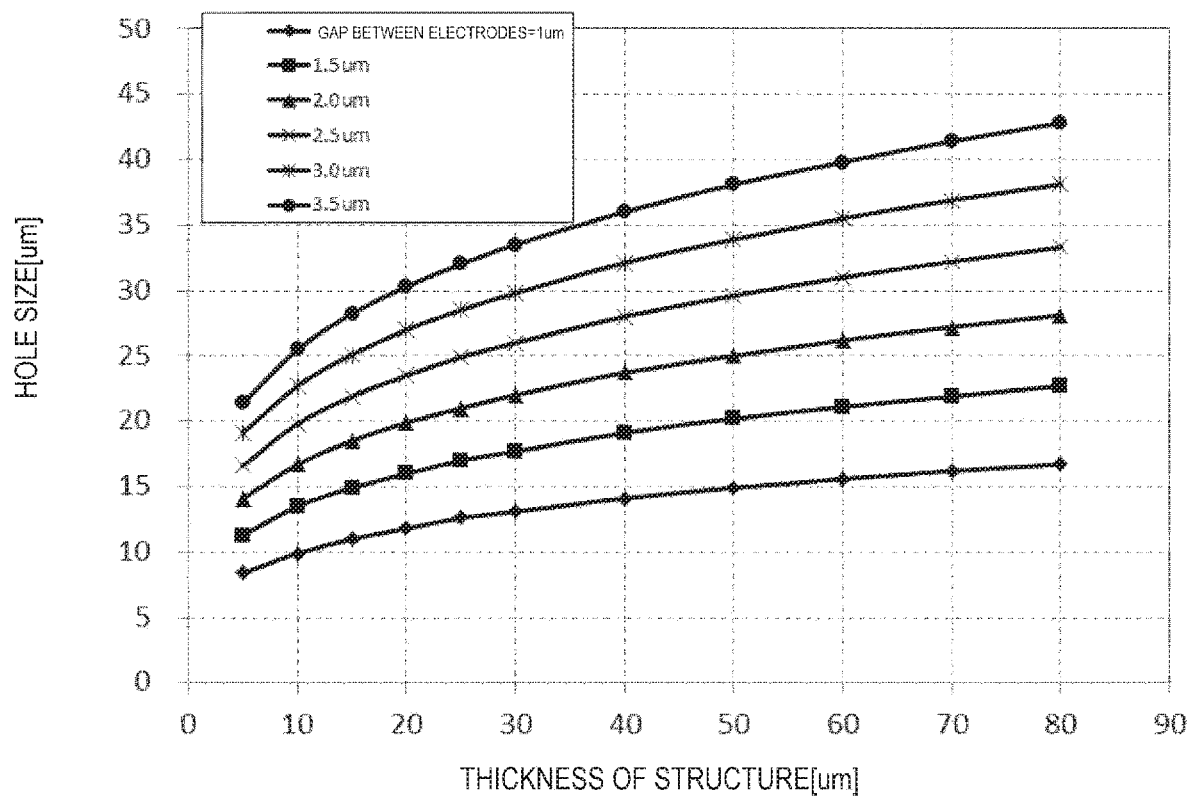
FIG. 7 is a graph showing the relationship between structure thickness and hole size.
Figure 8:
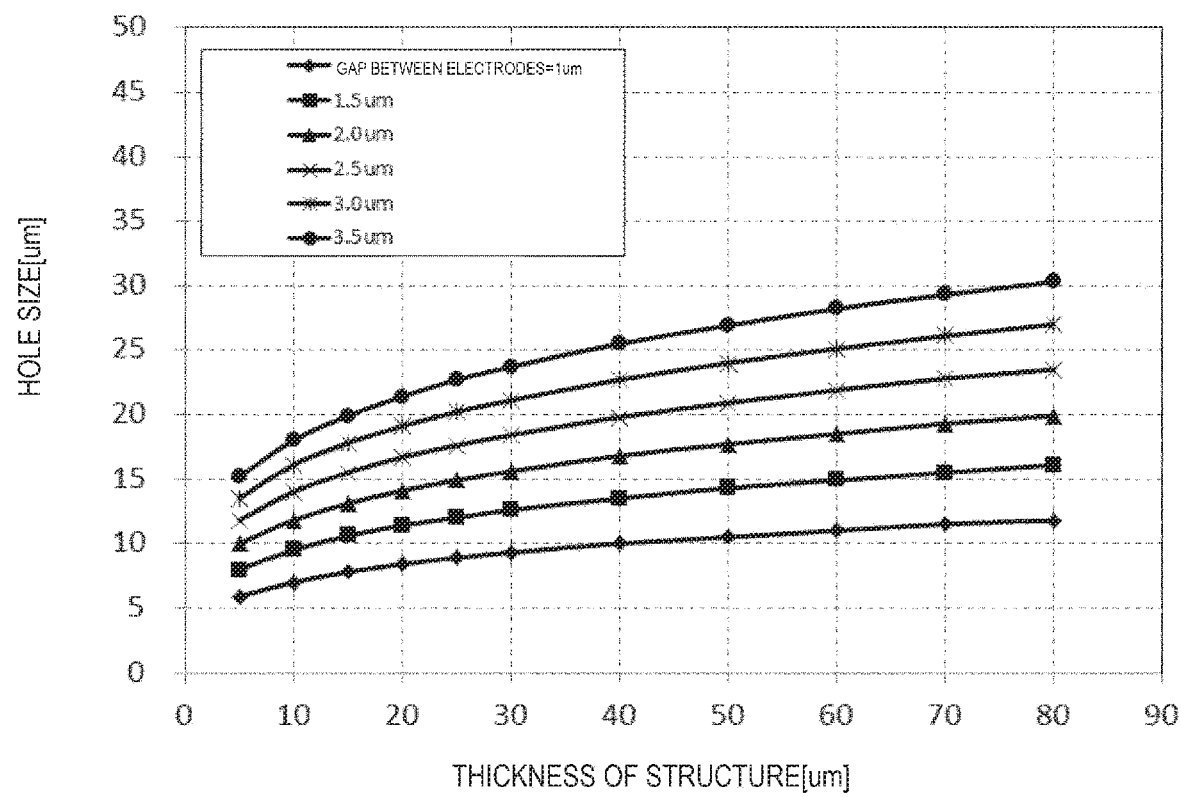
FIG. 8 is a graph showing the relationship between structure thickness and hole size.
Figure 9:
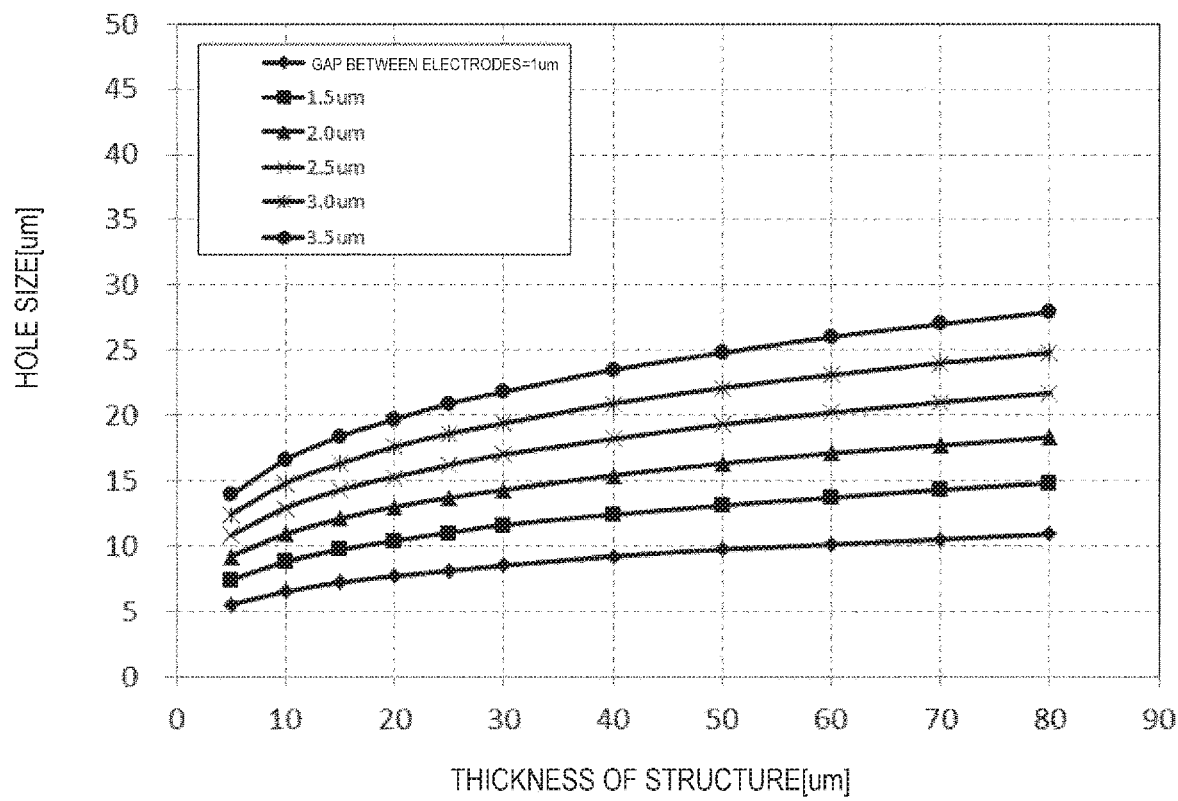
FIG. 9 is a graph showing the relationship between structure thickness and hole size.
Figure 10:
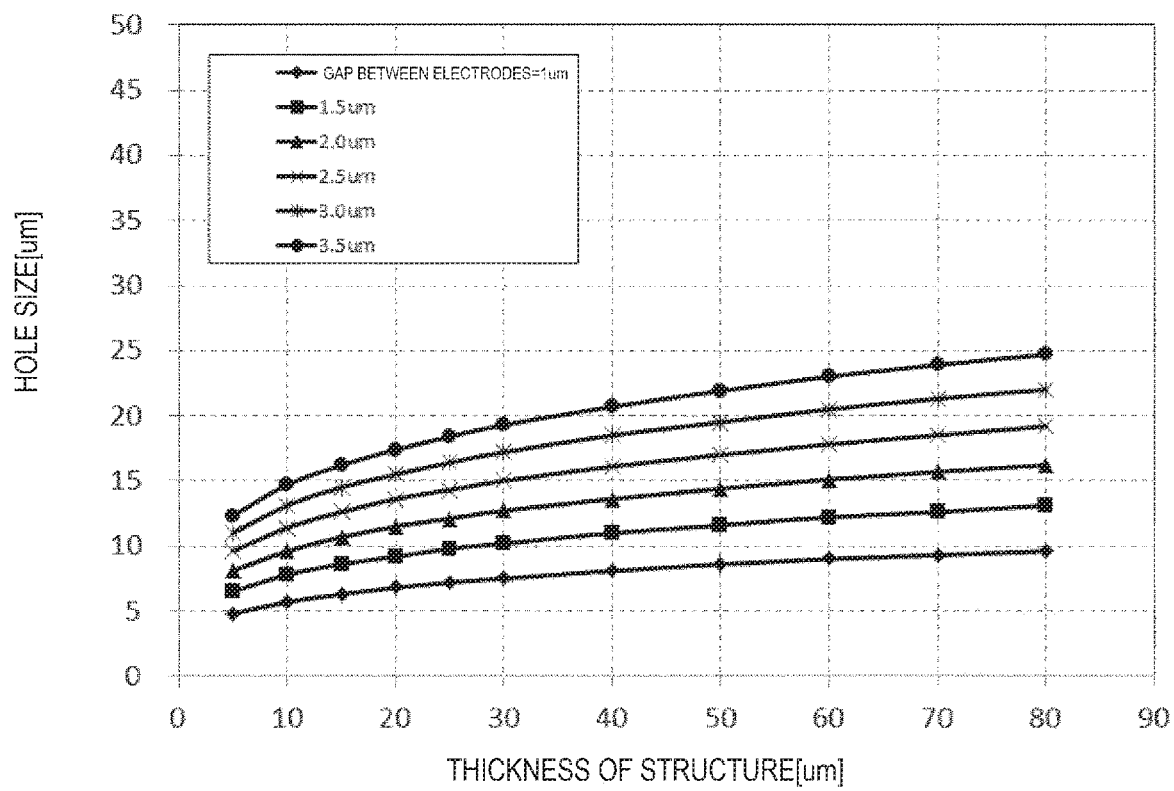
FIG. 10 is a graph showing the relationship between structure thickness and hole size.
Figure 11:
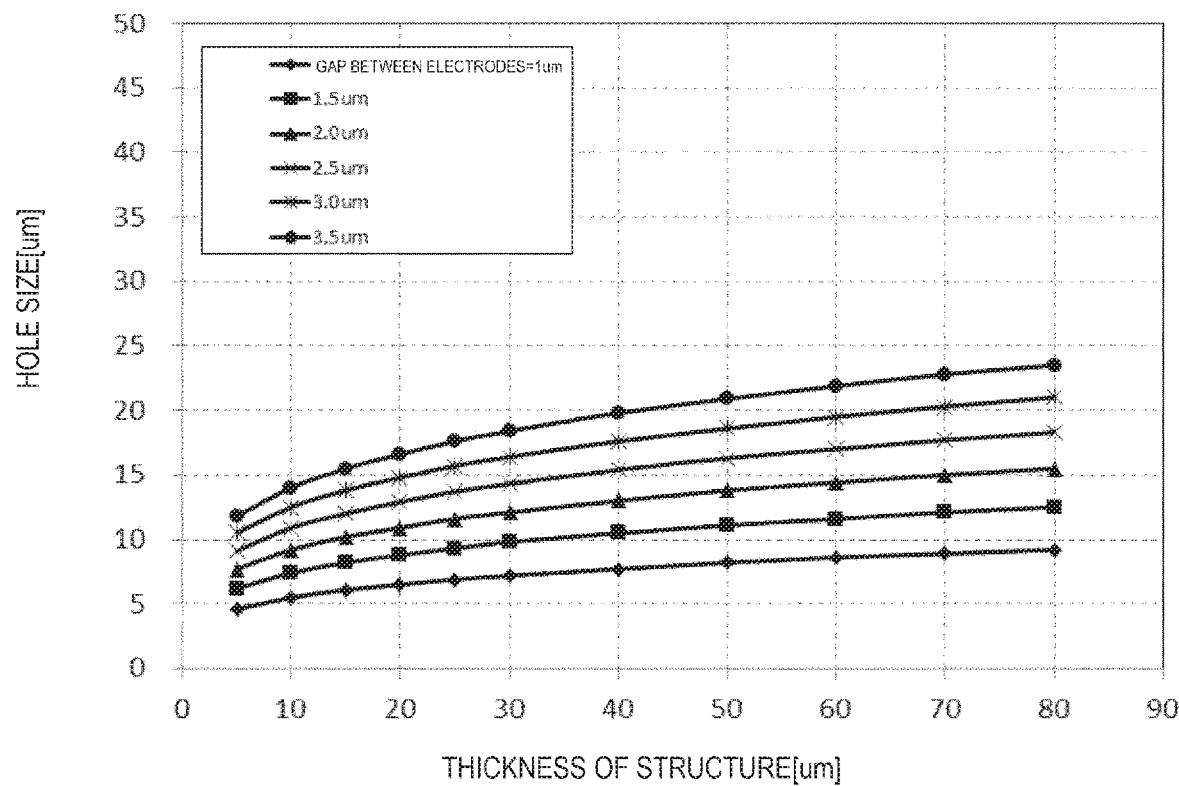
FIG. 11 is a graph showing the relationship between structure thickness and hole size.
Figure 12:
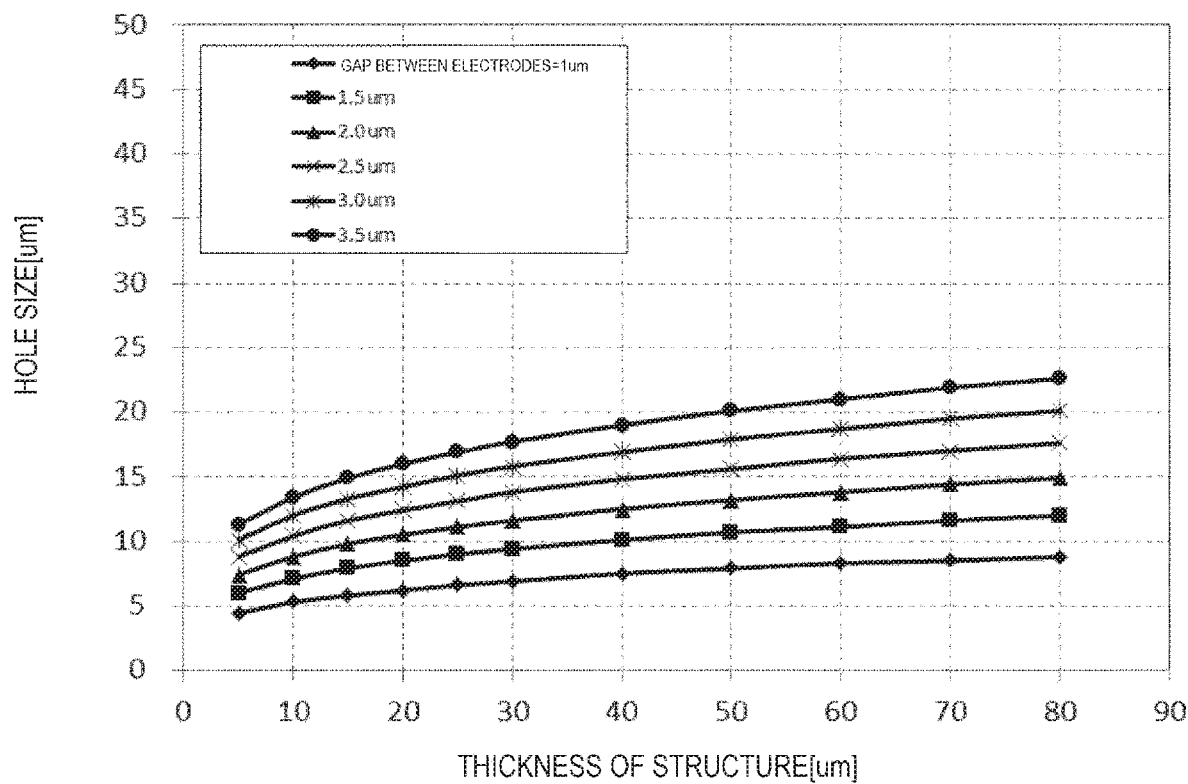
FIG. 12 is a graph showing the relationship between structure thickness and hole size.
Figure 13:
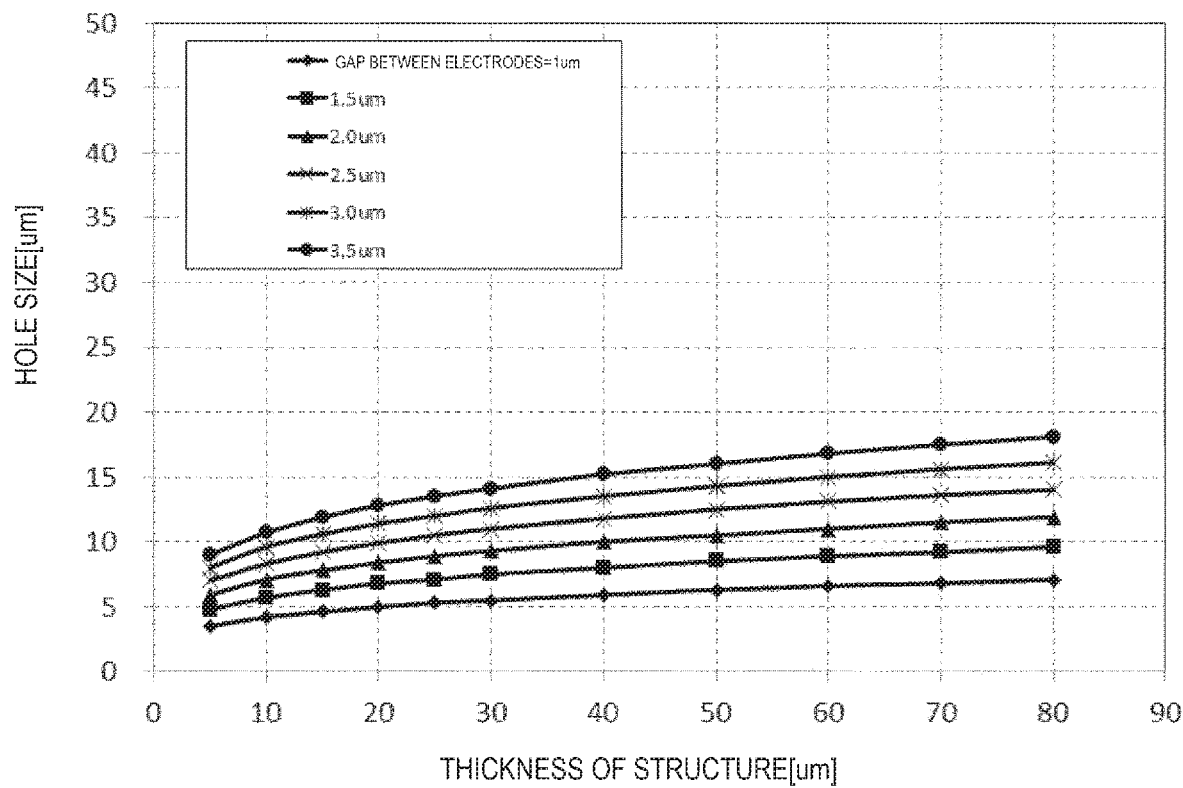
FIG. 13 is a graph showing the relationship between structure thickness and hole size.
Figure 14:
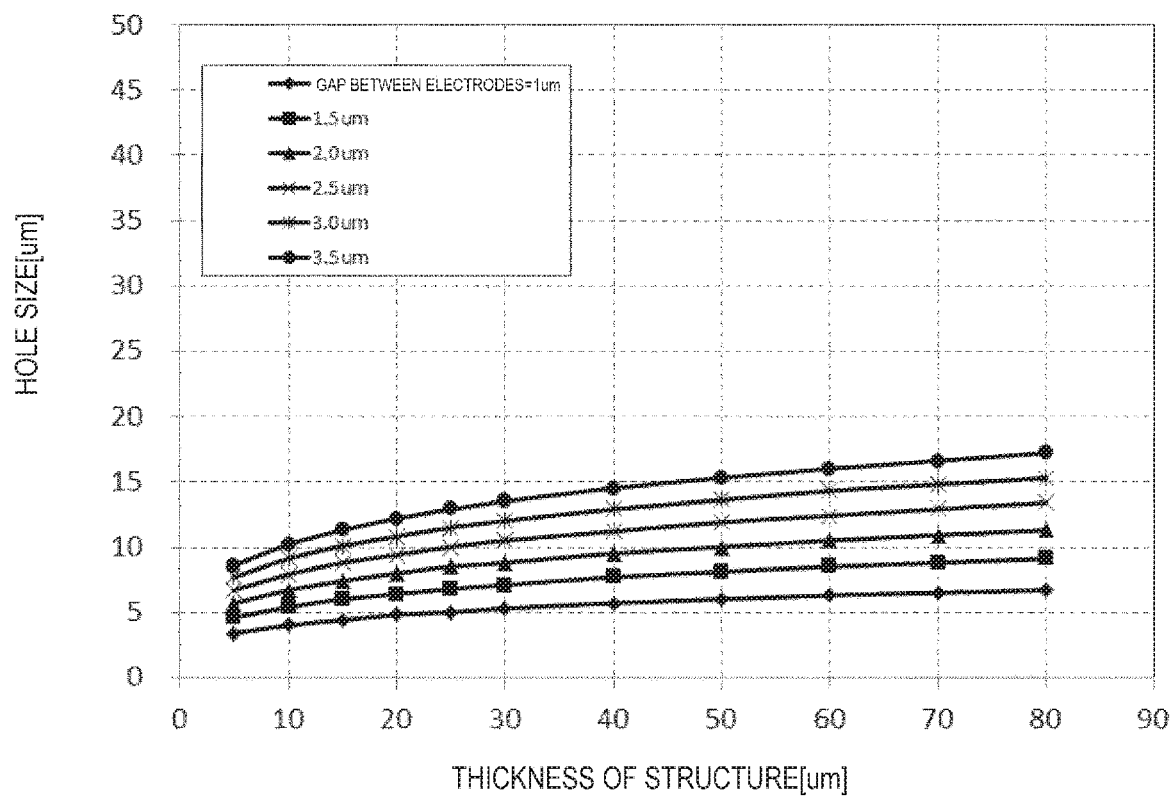
FIG. 14 is a graph showing the relationship between structure thickness and hole size.
Figure 15:
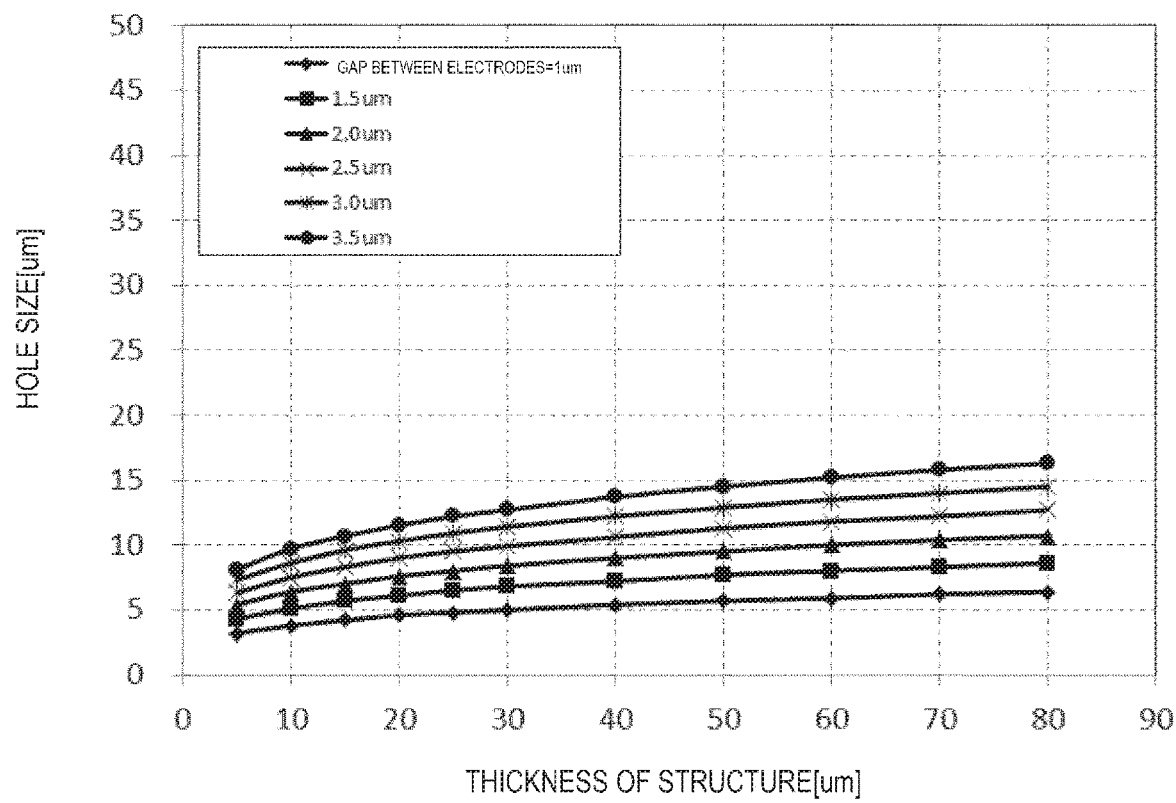
FIG. 15 is a graph showing the relationship between structure thickness and hole size.
Figure 16:
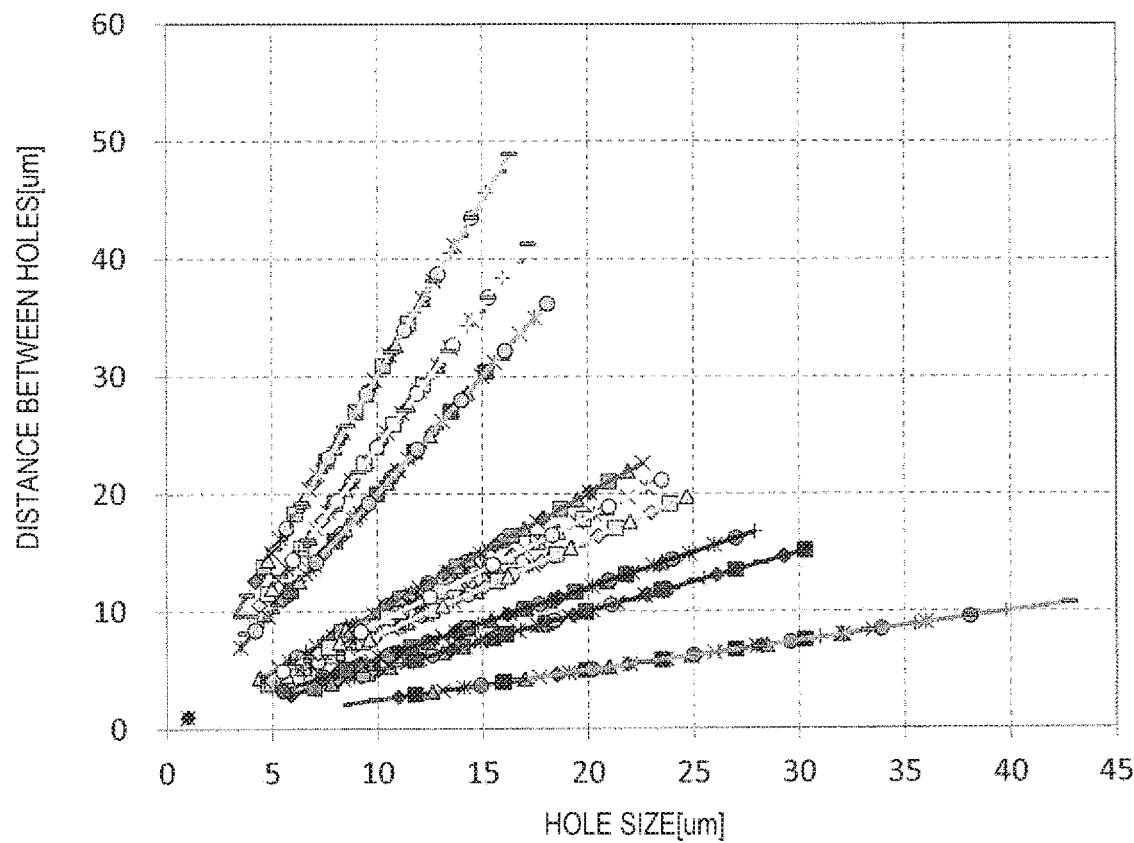
FIG. 16 is a graph showing the relationship between S0min, S1min and H, h.
Figure 17:
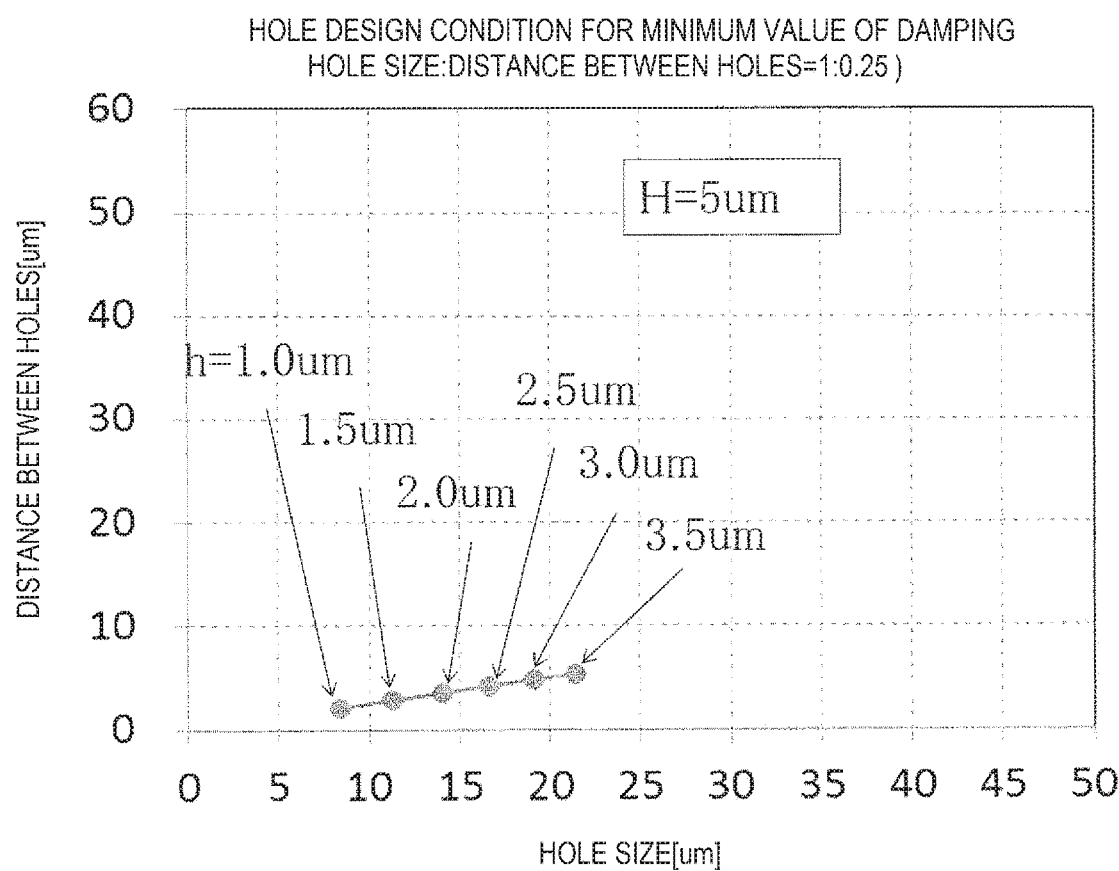
FIG. 17 is a graph showing the relationship between S0min, S1min and H, h.
Figure 18:
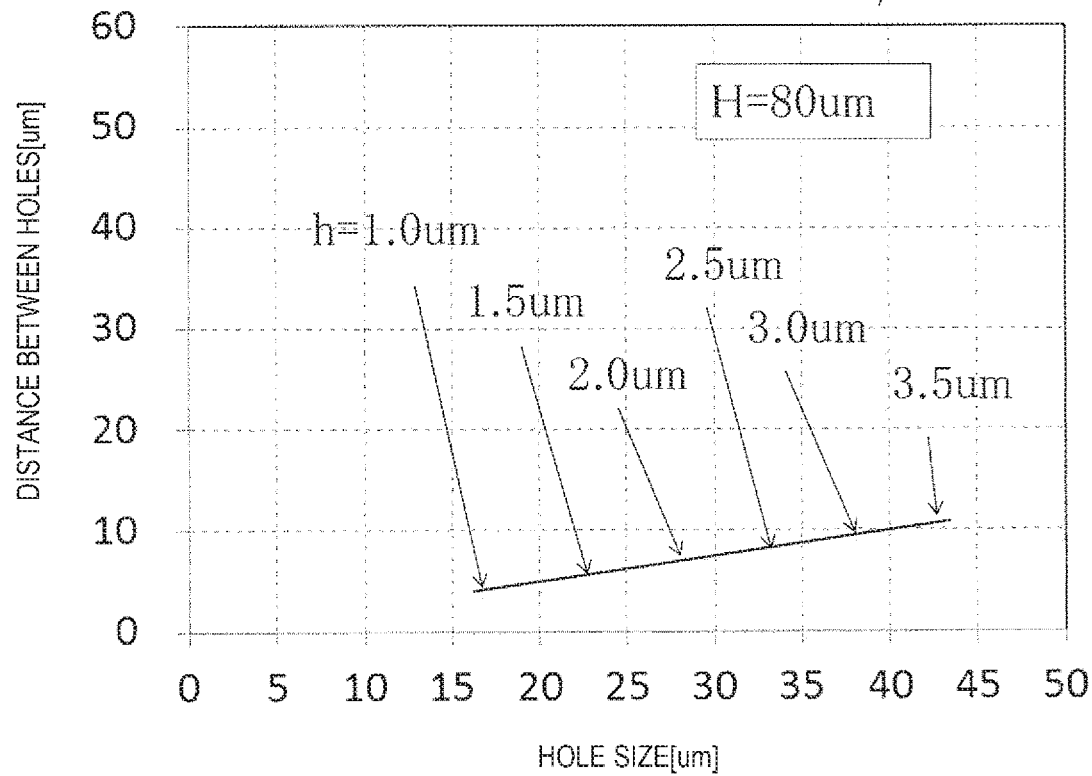
FIG. 18 is a graph showing the relationship between S0min, S1min and H, h.
Figure 23:
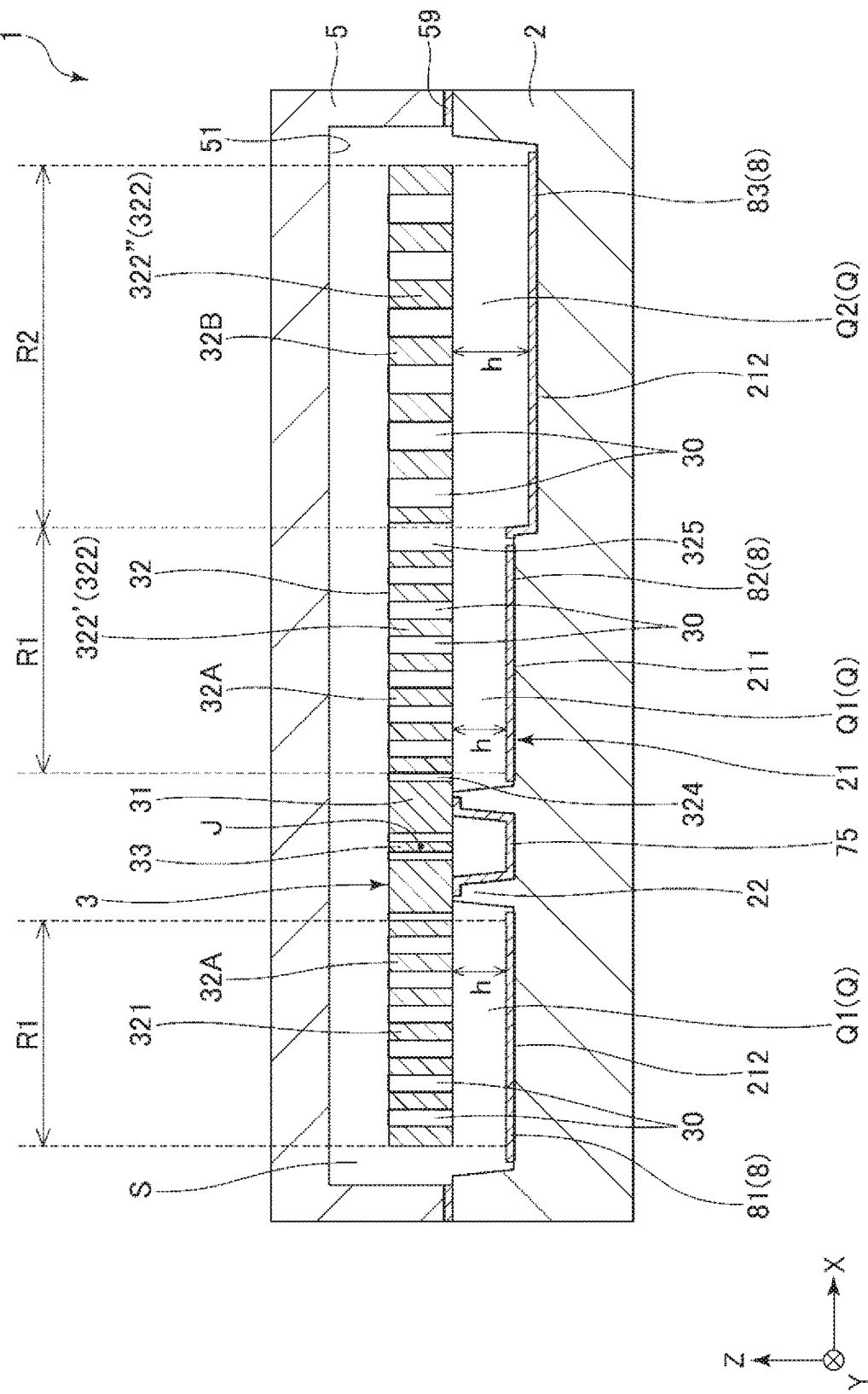
FIG. 23 is a cross-sectional view showing a modification example of the physical quantity sensor shown in FIG. 1.
Figure 24:
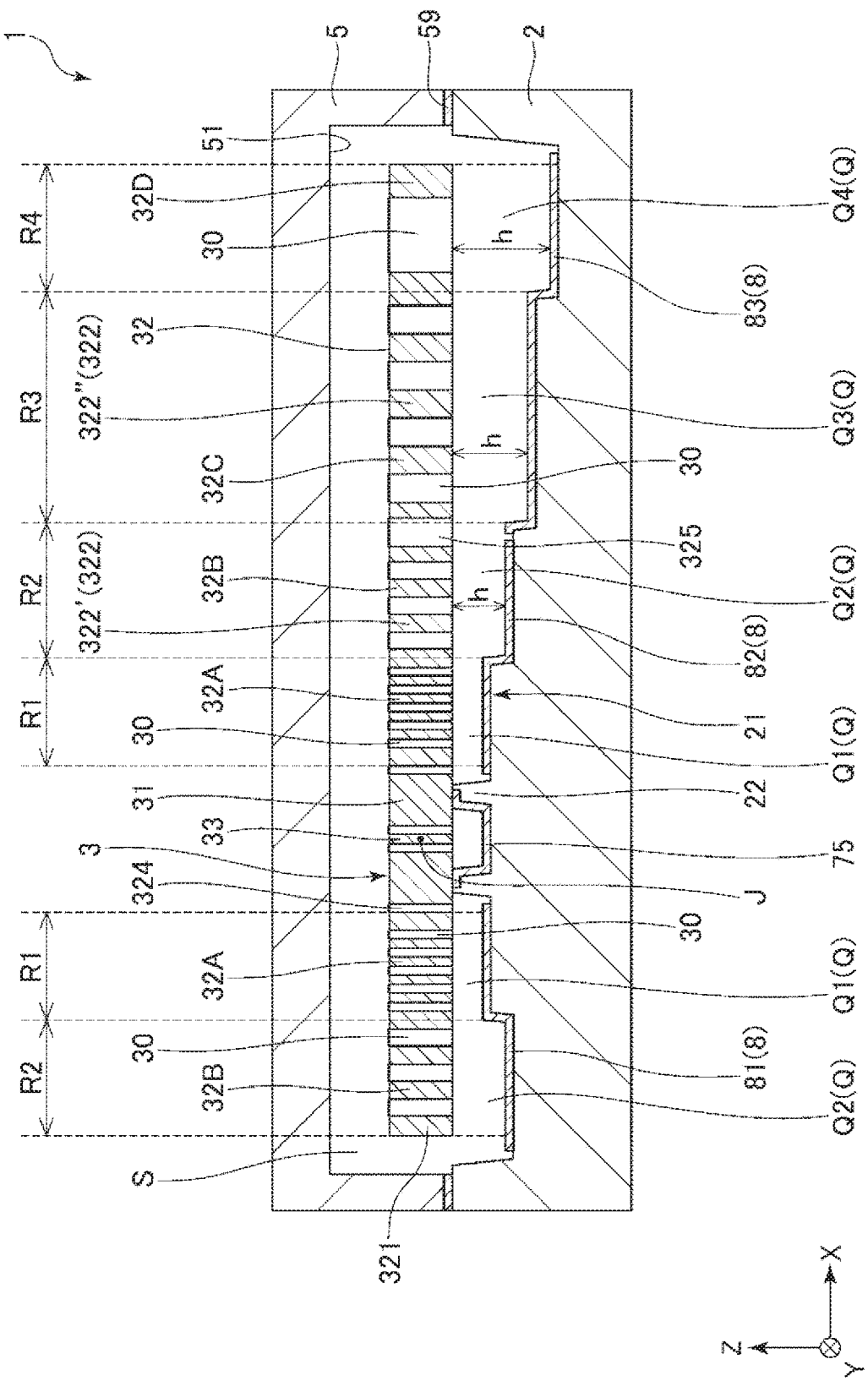
FIG. 24 is a cross-sectional view showing a modification example of the physical quantity sensor shown in FIG. 1.

FIG. 1 is a plan view showing the physical quantity sensor according to the first embodiment of the present disclosure. FIG. 2 is a cross-sectional view taken along A-A in FIG. 1. FIG. 3 shows a voltage applied to the physical quantity sensor shown in FIG. 1. FIG. 4 is a schematic view for explaining damping. FIG. 5 is a graph showing the relationship between S0 and damping. FIG. 6 is a graph showing the relationship between S1/S0, and sensitivity ratio and damping ratio. FIGS. 7 to 15 are graphs showing the relationship between structure thickness and hole size. FIGS. 16 to 18 are graphs showing the relationship between S0min, S1min and H, h. FIGS. 19 to 22 are graphs showing the relationship between S1min/S0min and H, h. FIGS. 23 and 24 are cross-sectional views showing a modification example of the physical quantity sensor shown in FIG. 1.

In the description below, for the sake of convenience of the description, an X-axis, a Y-axis, and a Z-axis are employed as three axes orthogonal to each other. A direction parallel to the X-axis is referred to as an X-axis direction, which is a second direction. A direction parallel to the Y-axis is referred to as a Y-axis direction, which is a first direction. A direction parallel to the Z-axis is referred to as a Z-axis direction, which is a third direction. The tip side of the arrow on each axis is referred to as a "positive side". The opposite side is referred to as a "negative side". The positive side of the Z-axis direction is referred to as "up". The negative side of the Z-axis direction is referred to as "down". Also, a plan view from the Z-axis direction is simply referred to as a "plan view".

In this specification, the meaning of the term "orthogonal" includes the state of intersecting at 90° and also the state of intersecting at an angle slightly deviated from 90°, for example, at approximately 80° to 100°. Specifically, the meaning of the term "orthogonal" includes the case where the X-axis is inclined at approximately −10° to +10° to the direction of a normal line to a YZ plane, the case where the Y-axis is inclined at approximately −10° to +10° to the direction of a normal line to an XZ plane, and the case where the Z-axis is inclined at approximately −10° to +10° to the direction of a normal line to an XY plane.

A physical quantity sensor 1 shown in FIG. 1 is an acceleration sensor configured to measure an acceleration Az in the Z-axis direction. Such a physical quantity sensor 1 has a substrate 2, an element part 3 arranged at the top of the substrate 2, and a lid 5 bonded to the substrate 2 in such a way as to cover the element part 3. These components will now be sequentially described in detail.

Substrate

As shown in FIG. 1, the substrate 2 is plate-shaped and has a recess 21 opening to an upper surface side. As viewed in a plan view from the Z-axis direction, the recess 21 is formed to be larger than the element part 3 so as to contain the element part 3 inside. The recess 21 functions as a clearance part that prevents contact between the element part 3 and the substrate 2. As shown in FIG. 2, the recess 21 has a first recess 211, a second recess 212 located at both sides of the X-axis direction of the first recess 211 and deeper than the first recess 211, and a third recess 213 located at the positive side of the X-axis direction of the second recess 212 and deeper than the second recess 212. Therefore, a gap Q between the substrate 2 and the element part 3 includes a first gap Q1 overlapping the first recess 211, a second gap Q2 overlapping the second recess 212 and having a longer length in the Z-axis direction and therefore a longer distance between the substrate 2 and the element part 3 than the first gap Q1, and a third gap Q3 overlapping the third recess 213 and having a longer length in the Z-axis direction and therefore a longer distance between the substrate 2 and the element part 3 than the second gap Q2. As viewed in a plan view from the Z-axis direction, the first recess 211 is arranged symmetrically about a rotation axis J, described later.

As shown in FIG. 2, the substrate 2 also has a protruding mount 22 provided at a bottom surface of the first recess 211. A fixed part 31 of the element part 3 is bonded to an upper surface of the mount 22. Thus, the element part 3 can be fixed to the substrate 2, in the state of being spaced apart from the bottom surface of the recess 21. As shown in FIG. 1, the substrate 2 also has grooves 25, 26, 27 opening to the upper surface side.

As the substrate 2, a glass substrate formed of, for example, a glass material containing an alkali metal ion (mobile ion such as Na+) (for example, a borosilicate glass such as Pyrex glass (trademark registered) or Tempax glass (trademark registered) can be used. However, the substrate 2 is not particularly limited and may be, for example, a silicon substrate or ceramic substrate.

As shown in FIG. 1, the substrate 2 has an electrode 8. The electrode 8 includes a first fixed electrode 81, a second fixed electrode 82, and a dummy electrode 83 that are arranged at the bottom surface of the recess 21. The substrate 2 also has wirings 75, 76, 77 arranged in the grooves 25, 26, 27. One end of each of the wirings 75, 76, 77 is exposed outside the lid 5 and functions as an electrode pad P for electrical coupling to an external device. The wiring 75 is electrically coupled to the element part 3 and the dummy electrode 83. The wiring 76 is electrically coupled to the first fixed electrode 81. The wiring 77 is electrically coupled to the second fixed electrode 82.

Lid

As shown in FIG. 2, the lid 5 has a plate-like shape and has a recess 51 opening to a lower surface side. The lid 5 is bonded to the upper surface of the substrate 2 in such a way as to accommodate the element part 3 inside the recess 51. The lid 5 and the substrate 2 together form an accommodation space S accommodating the element part 3 inside. The accommodation space S is an airtight space. The accommodation space S is filled with an inert gas such as nitrogen, helium or argon and has a substantially barometric pressure at operating temperatures (approximately −40° C. to 120° C.). However, the atmosphere in the accommodation space S is not particularly limited and may be, for example, a pressure-reduced state or a pressurized state.

As the lid 5, for example, a silicon substrate can be used. However, the lid 5 is not particularly limited to this and may be, for example, a glass substrate or ceramic substrate. The method for bonding the substrate 2 and the lid 5 is not particularly limited, either. A suitable method may be selected according to the materials of the substrate 2 and the lid 5. For example, anodic bonding, activated bonding in which bonding surfaces activated by plasma irradiation are bonded together, bonding with a bonding material such as a glass frit, diffusion bonding in which metal films formed at the upper surface of the substrate 2 and the lower surface of the lid 5 are bonded together, or the like, can be used. In this embodiment, the substrate 2 and the lid 5 are bonded together with a glass frit 59 formed of a low-melting-point glass.

Preferably, the lid 5 is coupled to the ground. Thus, the electric potential of the lid 5 can be kept constant and, for example, change in the electrostatic capacitance between the lid 5 and the element part 3 can be reduced. The distance between the bottom surface of the recess 51 and the element part 3 is not particularly limited. However, preferably this distance is, for example, 15 µm or longer, more preferably 20 µm or longer, and even more preferably 25 µm or longer. Thus, the electrostatic capacitance between the lid 5 and the element part 3 can be made sufficiently low and the acceleration Az can be detected more accurately.

Element Part

As shown in FIG. 1, the element part 3 has the fixed part 31 bonded to the upper surface of the mount 22, a plate-like moving member 32 that is displaceable in relation to the fixed part 31, and a support beam 33 coupling the fixed part 31 and the moving member 32 together. When the acceleration Az acts on the physical quantity sensor 1, the moving member 32 swings about the support beam 33 as the rotation axis J while torsionally deforming the support beam 33.

Such an element part 3 is formed, for example, by patterning an electrically conductive silicon substrate doped with an impurity such as phosphorus (P), boron (B), or arsenic (As), by dry etching. However, the method for forming the element part 3 is not particularly limited. The element part 3 is bonded to the upper surface of the substrate 2 by anodic bonding. However, the material of the element part 3 and the method for bonding the element part 3 and the substrate 2 together are not particularly limited.

The moving member 32 has a rectangular shape with its longitudinal direction laid along the X-axis direction as viewed in a plan view, and particularly in this embodiment, having its longer side along the X-axis direction. The moving member 32 has a first mass part 321 located at the negative side of the X-axis direction in relation to the rotation axis J, a second mass part 322 located at the positive side of the X-axis direction in relation to the rotation axis J, and a coupling part 323 coupling the first mass part 321 and the second mass part 322 together. The moving member 32 is coupled to the support beam 33 at the coupling part 323.

The second mass part 322 is longer in the X-axis direction than the first mass part 321 and has a greater moment of rotation, that is, a greater torque, than the first mass part 321 when the acceleration Az is applied. Due to this difference in the moment of rotation, the moving member 32 swings about the rotation axis J when the acceleration Az is applied. In the description below, a proximal part of the second mass part 322 that is symmetrical with the first mass part 321 about the rotation axis J is also referred to as a "base part 322'", and a distal part of the second mass part 322 that is asymmetrical with the first mass part 321 about the rotation axis J is also referred to as a "torque generation part 322''". At a boundary part between the base part 322' and the torque generation part 322'', an opening 325 extending in the Y-axis direction is formed.

The moving member 32 also has an opening 324 located between the first mass part 321 and the second mass part 322. The fixed part 31 and the support beam 33 are arranged inside the opening 324. Forming such a shape can achieve miniaturization of the element part 3. Also, the support beam 33 extends along the Y-axis direction and forms the rotation axis J. However, the arrangement of the fixed part 31 and the support beam 33 is not particularly limited and may be located, for example, at the outside of the moving member 32.

Back to the description of the electrode 8, the first fixed electrode 81 is arranged in the first recess 211 and the second recess 212, as shown in FIG. 2, and is arranged facing the first mass part 321, as viewed in a plan view from the Z-axis direction. The second fixed electrode 82 is arranged in the first recess 211 and the second recess 212 and is arranged facing the base part 322' of the second mass part 322, as viewed in a plan view from the Z-axis direction. The first and second fixed electrodes 81, 82 are arranged symmetrically about the rotation axis J, as viewed in a plan view from the Z-axis direction. The dummy electrode 83 is arranged in the second recess 212 and the third recess 213 and is arranged facing the torque generation part 322'' of the second mass part 322, as viewed in a plan view from the Z-axis direction.

To drive the physical quantity sensor 1, for example, a drive voltage V1 as shown in FIG. 3 is applied to the element part 3, and the first fixed electrode 81 and the second fixed electrode 82 are respectively coupled to a QV amplifier (charge-voltage converter circuit). An electrostatic capacitance Ca is formed between the first fixed electrode 81 and the first mass part 321. An electrostatic capacitance Cb is formed between the second fixed electrode 82 and the s base part 322' of the second mass part 322.

When the acceleration Az is applied to the physical quantity sensor 1, the moving member 32 swing about the rotation axis J while torsionally deforming the support beam 33, due to the difference in the moment of rotation between the first and second mass parts 321, 322. Such swinging of the moving member 32 causes the gap between the first mass part 321 and the first fixed electrode 81 and the gap between the base part 322' of the second mass part 322 and the second fixed electrode to change in the opposite phases. The electrostatic capacitances Ca, Cb change in the opposite phases accordingly. Thus, the physical quantity sensor 1 can detect the acceleration Az, based on the amount of change in the electrostatic capacitances Ca, Cb, more specifically, the difference between the electrostatic capacitances Ca, Cb.

As described above, the recess 21 has the first recess 211 overlapping the rotation axis J as viewed in a plan view from the Z-axis direction, the second recess 212 located at both sides of the X-axis direction of the first recess 211 and deeper than the first recess 211, and the third recess 213 located at the positive side of the X-axis direction of the second recess 212 and deeper than the second recess 212. That is, as shown in FIG. 2, the depth of the recess 21, that is, the distance between the recess 21 and the moving member 32, becomes greater as it goes away from the rotation axis J. Thus, the distance between the moving member 32 and the first and second fixed electrodes 81, 82 can be reduced while the contact between the moving member 32 and the substrate 2 when the moving member 32 swings is restrained. Reducing the distance from the first and second fixed electrodes 81, 82 enables the electrostatic capacitances Ca, Cb to increase accordingly and therefore improves the accuracy of detecting the acceleration Az.

In the description below, of the first and second mass parts 321, 322, a part overlapping the first recess 211 is referred to as a first part 32A, a part overlapping the second recess 212 is referred to as a second part 32B, and a part overlapping the third recess 213 is referred to as a third part 32C, as viewed in a plan view from the Z-axis direction. Also, an area overlapping the first part 32A is referred to as a first area R1, an area overlapping the second part 32B is referred to as a second area R2, and an area overlapping the third part 32C is referred to as a third area R3, as viewed in a plan view from the Z-axis direction.

In this embodiment, both of the first mass part 321 and the second mass part 322 have the first part 32A and the second part 32B, and only the second mass part 322 has the third part 32C. In the second mass part 322, the first and second parts 32A, 32B form the base part 322', and the third part 32C forms the torque generation part 322". Since the first mass part 321 and the base part 322' are formed by the first part 32A and the second part 32B, that is, since the part where the first and second fixed electrodes 81, 82 are arranged at the bottom surface of the recess 21 is formed as multiple steps, the average distance between the first fixed electrode 81 and the first mass part 321 and the average distance between the second fixed electrode 82 and the base part 322' of the second mass part 322 can be reduced further. This enables further increase in the electrostatic capacitances Ca, Cb and improves the accuracy of detecting the acceleration Az.

In this embodiment, the first part 32A of the first mass part 321 and the first part 32A of the second mass part 322 are arranged symmetrically with each other about the rotation axis J, and the second part 32B of the first mass part 321 and the second part 32B of the second mass part 322 are arranged symmetrically with each other about the rotation axis J, as viewed in a plan view from the Z-axis direction. Thus, the part overlapping the first fixed electrode 81 and the part overlapping the second fixed electrode 82 are arranged symmetrically with each other about the rotation axis J. Therefore, the electrostatic capacitances Ca, Cb can be equalized in a natural state where the acceleration Az is not applied. Thus, the natural state serves as a "zero point" where an output is zero, and zero-point correction to adjust the zero point to the natural state is not needed. Therefore, the physical quantity sensor 1 has a simple device configuration.

In each of the first mass part 321 and the second mass part 322, a plurality of penetration holes 30 penetrating the moving member 32 in the direction of the thickness thereof along the Z-axis are formed. Each penetration hole 30 of the plurality of penetration holes 30 has a square opening shape as viewed in a plan view and has a pair of sides extending in the X-axis direction and a pair of sides extending in the Y-axis direction.

The plurality of penetration holes 30 are evenly arranged over the entire area of the first part 32A. The plurality of penetration holes 30 are regularly arranged as viewed in a plan view, and particularly in this embodiment, arranged in a matrix along the X-axis direction and the Y-axis direction. The plurality of penetration holes 30 arranged in the first part 32A are the same size as each other.

The plurality of penetration holes 30 are evenly arranged also over the entire area of the second part 32B. The plurality of penetration holes 30 are regularly arranged as viewed in a plan view, and particularly in this embodiment, arranged in a matrix along the X-axis direction and the Y-axis direction. The plurality of penetration holes 30 arranged in the second part 32B are the same size as each other.

The plurality of penetration holes 30 are evenly arranged also over the entire area of the third part 32C. The plurality of penetration holes 30 are regularly arranged as viewed in a plan view, and particularly in this embodiment, arranged in a matrix along the X-axis direction and the Y-axis direction. The plurality of penetration holes 30 arranged in the third part 32C are the same size as each other.

The meaning of the term "evenly" includes not only the case where the distance between the penetration holes 30 next to each other in the X-axis direction and the Y-axis direction is equal among all the penetration holes 30 but also the case where the distance between some penetration holes 30 is different from the distance between the other penetration holes 30 slightly, for example, by approximately 10% or less, in consideration of an error or the like that can occur in manufacturing. Similarly, the term "square" means being substantially square and includes not only a complete square but also a shape slightly different from a square, for example, a square-like shape with the four corners chamfered or rounded, with at least one corner deviated from 90° by a range of approximately ±10°, with at least one side having a slightly different length from the other sides, or with an opening having an aspect ratio within a range of approximately 1:1.1 to 1.1:1, in consideration of an error or the like that can occur in manufacturing.

The design of the penetration hole 30 will now be described specifically. The penetration hole 30 is provided to control damping of a gas when the moving member 32 swings. As shown in FIG. 4, the damping includes hole damping of a gas passing through the penetration hole 30 and squeeze film damping between the moving member 32 and the substrate 2.

Making the penetration hole 30 larger facilitates the passage of a gas through the penetration hole 30 and therefore can reduce the hole damping. Also, increasing the occupancy rate of the penetration hole 30 reduces the facing area between the moving member 32 and the substrate 2, and therefore can reduce the squeeze film damping. However, at the same time, the facing area between the moving member 32 and the first and second fixed electrodes 81, 82 decreases and the mass of the torque generation part 322" decreases, resulting in a drop in the sensitivity of detecting the acceleration Az. On the other hand, making the penetration holes 30 smaller, that is, reducing the occupancy rate, increases the facing area between the moving member 32 and the first and second fixed electrodes 81, 82, and increases the mass of the torque generation part 322", resulting in an improvement in the sensitivity of detecting the acceleration Az. However, the damping increases. In this way, the improvement in the sensitivity of detection and the reduction in the damping are in a trade-off relationship. According to the related art, it is very difficult to achieve both.

To cope with such a problem, in the physical quantity sensor 1, the design of the penetration hole 30 is contrived to achieve both the improvement in the sensitivity of detection and the reduction in the damping. This designing will now be described specifically. The sensitivity of detection of the physical quantity sensor 1 is proportional to (A) $1/h^2$, where h is the distance between the moving member 32 and the first and second fixed electrodes 81, 82, (B) the facing area between the moving member 32 and the first and second fixed electrodes 81, 82, (C) the spring stiffness of the support beam 33 (proportional to the length H in the Z-axis direction of the penetration hole 30 when the thickness of the structure is uniform), and (D) the mass of the torque generation part 322". In the physical quantity sensor 1, first, in the state where the damping is ignored, H and h necessary to achieve a required sensitivity of detection, and the facing area between the moving member 32 and the first and second fixed electrodes 81, 82, that is, the occupancy rate of the penetration hole 30 in the first mass part 321 and the base part 322', are decided. Thus, the electrostatic capacitances Ca, Cb of a required magnitude are formed and the physical quantity sensor 1 achieves a sufficient sensitivity of detection.

The occupancy rate of the plurality of penetration holes 30 in the first part 32A, the second part 32B, and the third part 32C is not particularly limited but is preferably 75% or higher, more preferably 78% or higher, and even more preferably 82% or higher. Thus, both of the improvement in the sensitivity of detection and the reduction in the damping are achieved more easily.

As the occupancy rate of the penetration holes 30 in the first mass part 321 and the base part 322' is decided in this way, designing is then performed separately for each of the first area R1, the second area R2, and the third area R3 having different distances h between the bottom surface of the recess 21 and the element part 3. As a novel technical idea for minimizing the damping without changing the sensitivity, in the physical quantity sensor 1, the plurality of penetration holes 30 are designed in such a way that the difference between the hole damping and the squeeze film damping shown in FIG. 4 becomes as little as possible, preferably, in such away that the hole damping and the squeeze film damping become equal. Making the difference between the hole damping and the squeeze film damping as little as possible in this way can reduce the damping. When the hole damping and the squeeze film damping are equal, the damping is minimum. Therefore, the physical quantity sensor 1 can maintain a sufficiently high sensitivity of detection and can effectively reduce the damping.

The damping designing method is similar among the first area R1, the second area R2, and the third area R3. Therefore, the damping design for the first area R1 is described below as a representative example. The description of the damping design for the second area R2 and the third area R3 is omitted.

The damping C generated in the first part 32A is expressed by the following formula (2):

$$C = 2aL\frac{8\mu H}{\beta^2 r_0^2}\left(1 + \frac{3r_0^4 K(\beta)}{16Hh^3}\right)\left[1 - \frac{l}{a}\tanh\left(\frac{a}{l}\right)\right]. \tag{2}$$

In the formula (2), H [μm] is the length along the Z-axis of the penetration hole 30 arranged in the first part 32A (thickness of the moving member 32), a [μm] is half the length along the Y-axis direction of the first part 32A of the first and second mass parts 321, 322, L [μm] is the length along the X-axis direction, h [μm] is the length along the Z-axis direction of the distance between the electrode 8 provided at the substrate 2 and the first part 32A, that is, the first gap Q1, S0 [μm] is the length of one side of the square of the penetration hole 30 arranged in the first part 32A, S1 [μm] is the space between the penetration holes 30 next to each other in the X-axis direction or the Y-axis direction in the first part 32A, μ [kg/ms] is the viscous resistance (coefficient of viscosity) of a gas in the first gap Q1, that is, a gas that fills the accommodation space S, and C is the damping generated in the first part 32A. The formula (2) is similar to the foregoing formula (1). When the space between the penetration holes 30 next to each other in the X-axis direction and the space between the penetration holes 30 next to each other in the Y-axis direction are different, the average value of these spaces can be used.

The parameters used in the formula (2) are expressed by the following formulae (3) to (9).

$$H_{eff} = H + \frac{3\pi r_0}{8} \tag{3}$$

$$l = \sqrt{\frac{2h^3 H_{eff}\eta(\beta)}{3\beta^2 r_0^2}} \tag{4}$$

$$\eta(\beta) = 1 + \frac{3r_0^4 K(\beta)}{16Hh^3} \tag{5}$$

$$K(\beta) = 4\beta^2 - \beta^4 - 4\ln\beta - 3 \tag{6}$$

$$\beta = \frac{r_0}{r_c} \tag{7}$$

$$r_c = \frac{S0 + S1}{\sqrt{\pi}} \tag{8}$$

$$r_0 = 0.547 \times S0 \tag{9}$$

The hole damping component included in the formula (2) is expressed by the following formula (10), and the squeeze film damping is expressed by the following formula (11).

$$2aL\frac{8\mu H}{\beta^2 r_0^2}\left[1 - \frac{l}{a}\tanh\left(\frac{a}{l}\right)\right] \tag{10}$$

$$2aL\frac{8\mu H}{\beta^2 r_0^2}\left(\frac{3r_0^4 K(\beta)}{16Hh^3}\right)\left[1 - \frac{l}{a}\tanh\left(\frac{a}{l}\right)\right] \tag{11}$$

Therefore, using the dimensions H, h, S0, S1 equalizing the formula (10) and the formula (11), that is, satisfying the following formula (12), minimizes the damping C.

$$\frac{3r_0^4 K(\beta)}{16Hh^3} = 1 \tag{12}$$

Now, when satisfying the formula (12), the length S0 of one side of the penetration hole 30 is defined as S0min, and the space S1 between the penetration holes 30 next to each other is defined as S1min. The damping C when S0min and S1min are substituted into the formula (2), that is, the minimum value of the damping C, is defined as Cmin. Although it depends on the accuracy required of the physical quantity sensor 1, the damping can be sufficiently reduced when the range of S0, S1 satisfies the following formula (13), with H and h being constant.

$$C \leq 1.5 \times C\min \tag{13}$$

That is, when the minimum value Cmin of the damping is +50% or less, the damping can be sufficiently reduced. Therefore, the sensitivity of detection can be maintained within a desired range and noise can be reduced. Preferably, the following formula (14) is satisfied. More preferably, the following formula (15) is satisfied. Even more preferably, the following formula (16) is satisfied.

$$C \leq 1.4 \times C\min \tag{14}$$

$$C \leq 1.3 \times C\min \tag{15}$$

$$C \leq 1.2 \times C\min \tag{16}$$

Thus, the foregoing effects become more prominent.

FIG. 5 is a graph showing the relationship between the length S0 of one side of the penetration hole 30 and the damping. It is assumed that H and h are constant and that the S1/S0 ratio is 1 so as to achieve a constant sensitivity. This means that the aperture ratio does not change even when the value of S0 is changed. From this graph, it can be understood that the damping of the formula (2) can be separated into the squeeze film damping of the formula (11) and the damping in the hole of the formula (10), that the hole damping is dominant in an area where S0 is smaller than S0min, and that the squeeze film damping is dominant in an area where S0 is greater than S0min. S0 satisfying the formula (13) ranges from S0', which is smaller than S0min, to S0", which is greater than S0min. In the range from S0min to S0', the change in the damping in relation to the dimensional variation of S0 is greater than in the range from S0min to S0", and therefore a higher dimensional accuracy is required. Therefore, S0 within the range from S0min to S0", where the dimensional accuracy can be relaxed, may be preferably employed. The same applies to the case where the formulae (14) to (16) are satisfied.

The relationship between S0 and S1 is not particularly limited. However, preferably, the following formula (17) is satisfied. More preferably, the following formula (18) is satisfied. Even more preferably, the following equation (19) is satisfied.

$$0.25 \leq S1/S0 \leq 3.00 \tag{17}$$

$$0.6 \leq S1/S0 \leq 2.40 \tag{18}$$

$$0.8 \leq S1/S0 \leq 2.00 \tag{19}$$

When such relationships are satisfied, the penetration holes 30 can be formed in a well-balanced manner in the moving member 32. FIG. 6 is a graph showing the relationship between S1/S0, and sensitivity ratio and minimum damping ratio. The sensitivity ratio is the ratio to the sensitivity where S1/S0=1. The minimum damping is the ratio to the minimum damping where S1/S0=1. As can be understood from FIG. 6, where S1/S0>3, the rate of increase in the sensitivity ratio tends to reach saturation, and the minimum damping ratio tends to increase significantly. Therefore, satisfying the formulae (17) to (19) enables sufficient increase in the sensitivity of detection and sufficient reduction in the damping.

Now, a simulation and experimental verification about the dimensional ratio S1/S0 in the process of deriving the ranges expressed by the formulae (17) to (19) is described below in detail. FIGS. 7 to 15 show plotted values of the hole size and the distance between holes that achieve S0min, S1min, where H is 5 to 80 μm, h is 1.0 to 3.5 μm, and S1/S0 is 0.25 to 3.0. FIG. 16 is a graph collectively showing the values of S0min, Smin1 acquired in FIGS. 7 to 15, where the horizontal axis represents S0 and the vertical axis represents S1. As an example, FIG. 17 shows S0min, S1min acquired where S1/S0=0.25, H=5 μm, and h=1.0 to 3.5 μm. FIG. 18 shows S0min, S1min acquired where S1/S0=0.25, H=80 μm, and h=1.0 to 3.5 μm. From FIGS. 17 and 18, it is understood that the dimensions of S0min, S1min tend to become larger as H or h becomes greater.

Figure 19:
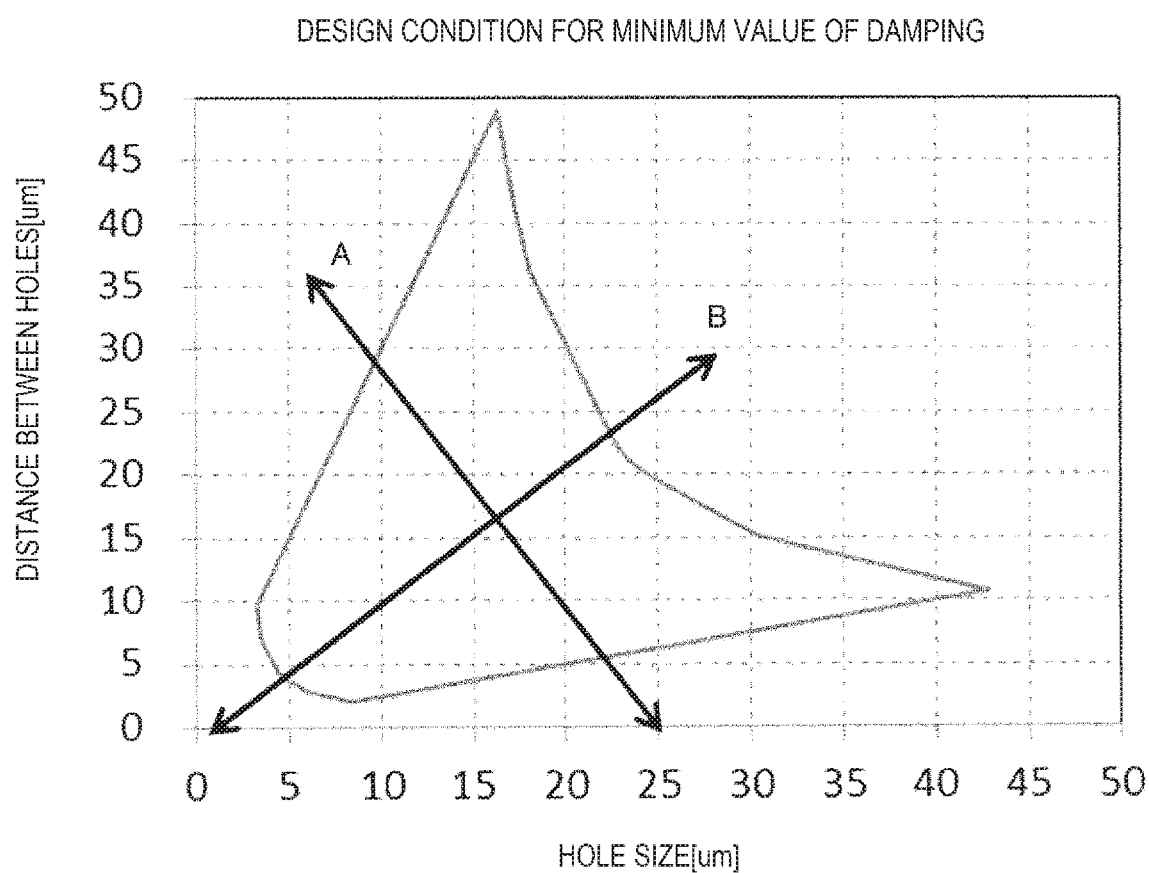
FIG. 19 is a graph showing the relationship between S1min/S0min and H, h.
Figure 20:
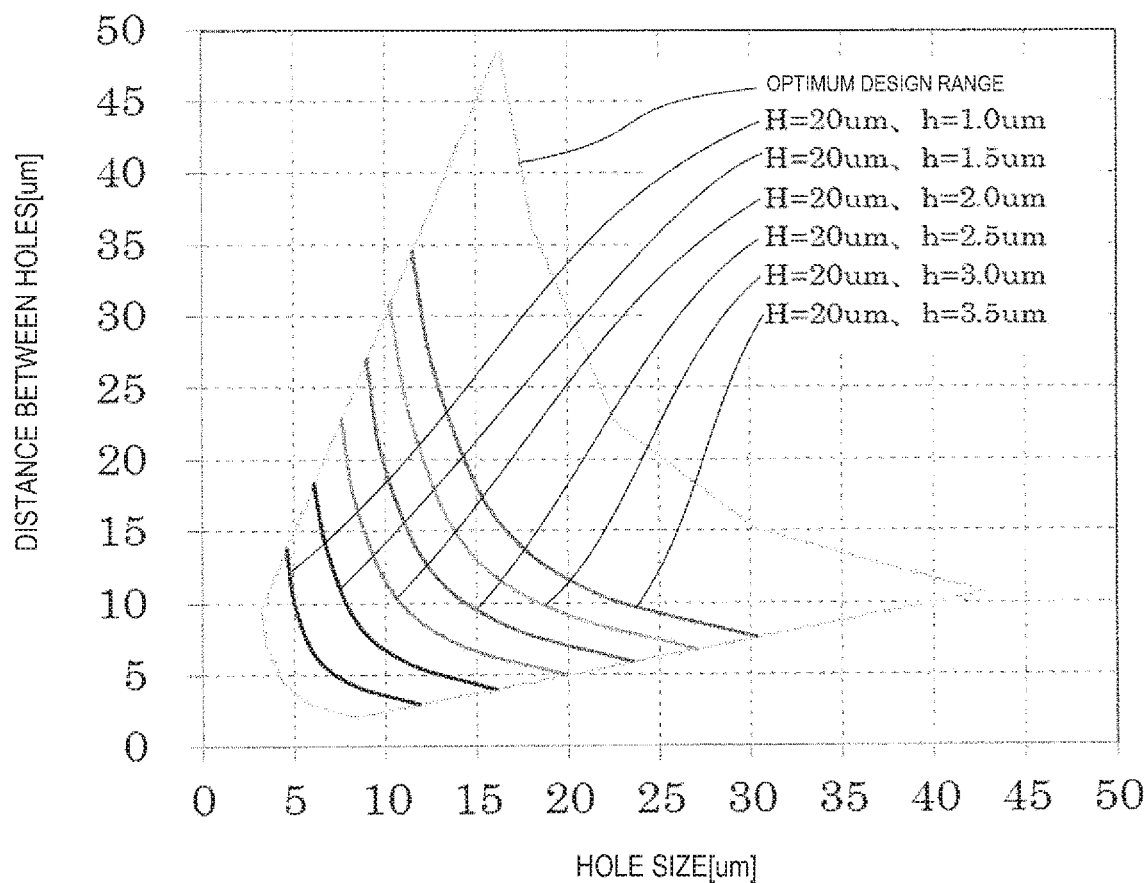
FIG. 20 is a graph showing the relationship between S1min/S0min and H, h.
Figure 21:
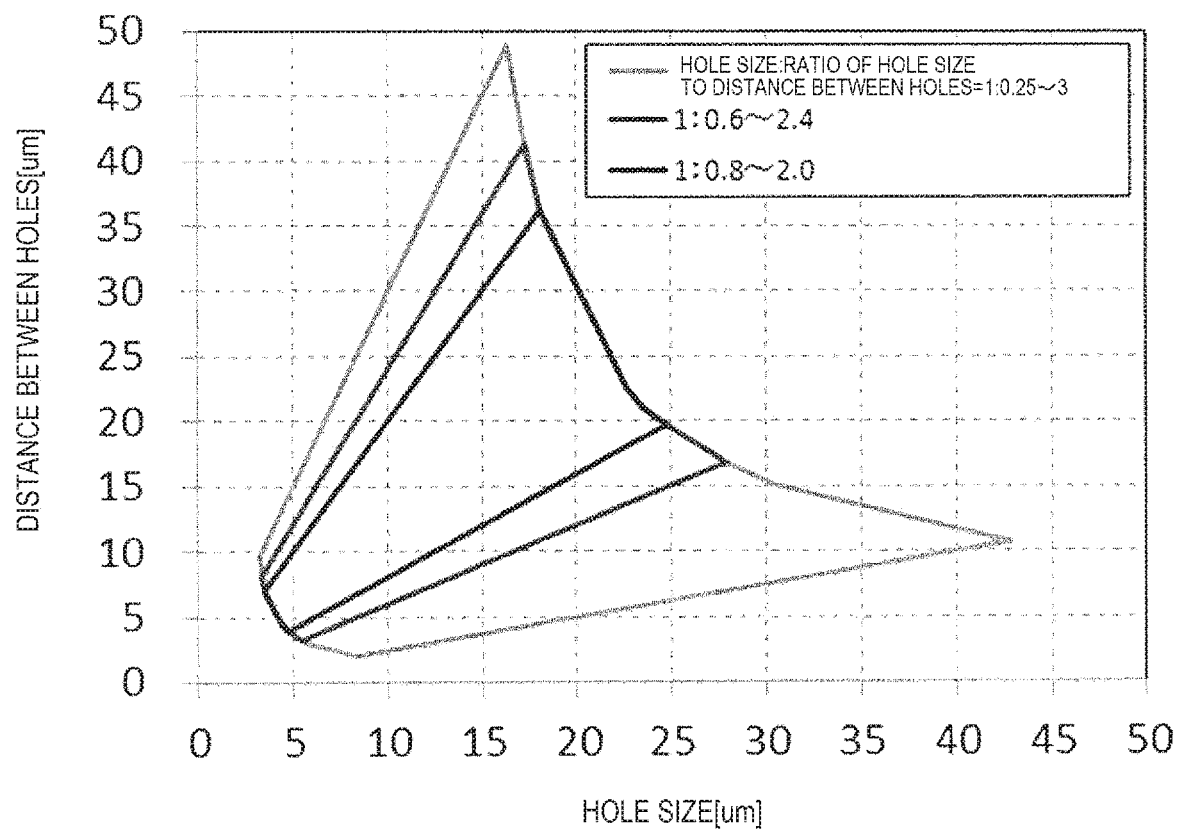
FIG. 21 is a graph showing the relationship between S1min/S0min and H, h.
Figure 22:
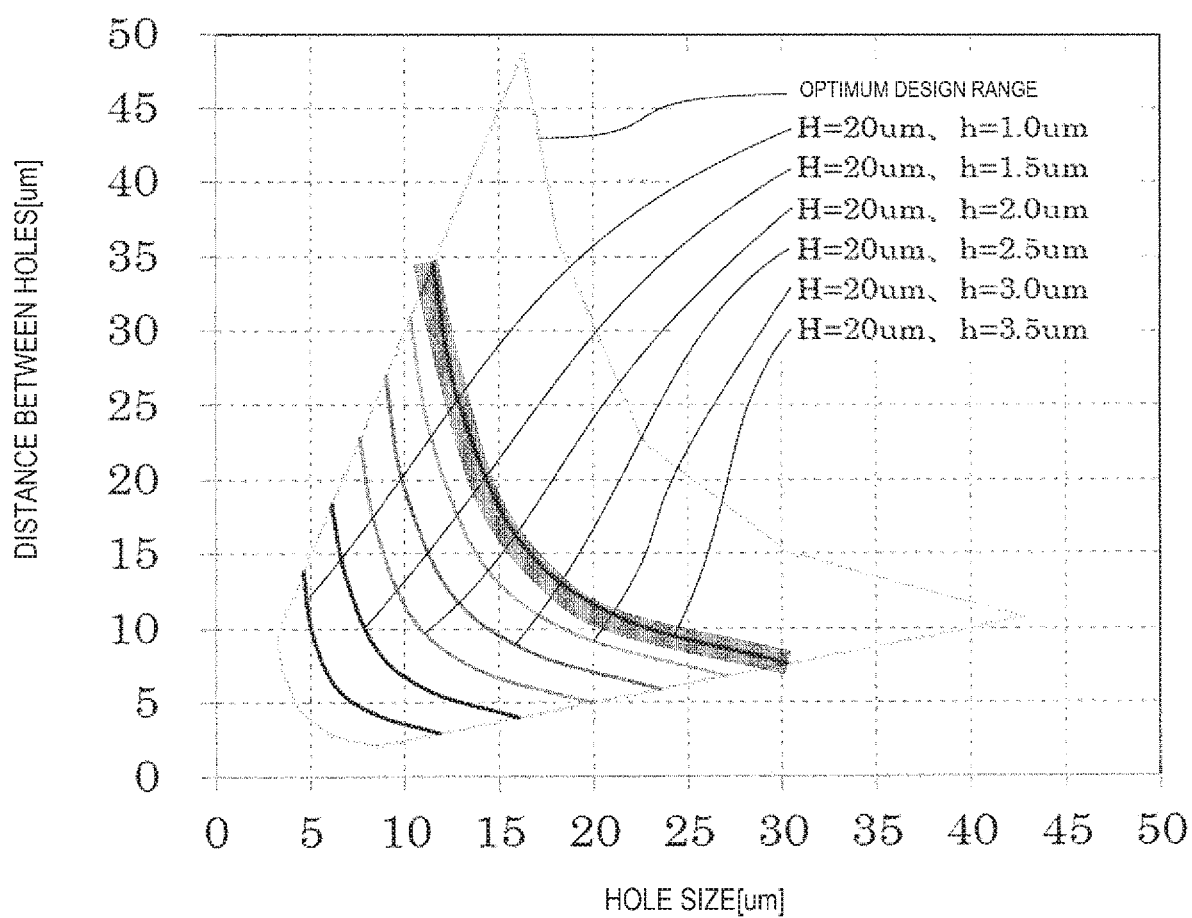
FIG. 22 is a graph showing the relationship between S1min/S0min and H, h.

FIG. 19 shows a range of all the points of S0min, S1min where H is 5 to 80 μm, h is 1.0 to 3.5 μm, and S1/S0 is 0.25 to 3.00. The direction of an arrow A is decided within the range of S1/S0. The direction of an arrow B is decided within the range of H, h. As an example, the conditions for S0min, S1min where S1min/S0min=0.25 to 3, H=20 μm, and h=1.0 to 3.5 μm are as shown in FIG. 20. Also, FIG. 21 shows areas to which S1min/S0min is limited respectively within the ranges of the formulae (17) to (19), where H=5 to 80 μm and h=1.0 to 3.5 μm.

Up to this point, S0min, S1min have been described. However, as for S0, S1 that fall within the range of the formulae (13) to (16), for example, when the case where H=20 μm and h=3.5 μm is considered, the range includes the peripheries of S0min, S1min and therefore results in the range shown in FIG. 22, that is, as a whole, a range extended only on two sides.

The damping design for the first area R1 has been described. The damping design for the second area R2 is similarly performed. The dimension of each part is designed to satisfy the formula (13). Thus, the damping in the second area R2 can be sufficiently reduced. Also, preferably, the damping design for the second area R2 satisfies the formula (14). More preferably, the damping design satisfies the formula (15). Even more preferably, the damping design satisfies the formula (16). Thus, the foregoing effects become more prominent. Also, preferably, the damping design for the second area R2 satisfies the formulae (17) to (19). Thus, a sufficiently high sensitivity of detection and sufficient reduction in the damping in the second area R2 can be achieved.

In the case of the second area R2, the parameters in the formulae can be understood as follows. That is, H [μm] is the length along the Z-axis of the penetration hole 30 arranged in the second part 32B, a [μm] is half the length along the Y-axis direction of the second part 32B of the first and second mass parts 321, 322, L [μm] is the length along the X-axis direction, h [μm] is the length along the Z-axis direction of the distance between the electrode 8 provided at the substrate 2 and the second part 32B, that is, the second gap Q2, S0 [μm] is the length of one side of the square of the penetration hole 30 arranged in the second part 32B, S1 [μm] is the space between the penetration holes 30 next to each other in the second part 32B, μ [kg/ms] is the viscous resistance (coefficient of viscosity) of a gas in the second gap Q2, that is, a gas that fills the accommodation space S, and C is the damping generated in the second part 32B.

The damping design for the third area R3 is similarly performed. The dimension of each part is designed to satisfy the formula (13). Thus, the damping in the third area R3 can be sufficiently reduced. Also, preferably, the damping design for the third area R3 satisfies the formula (14). More preferably, the damping design satisfies the formula (15). Even more preferably, the damping design satisfies the formula (16). Thus, the foregoing effects become more prominent. Also, preferably, the damping design for the third area R3 satisfies the formulae (17) to (19). Thus, a sufficiently high sensitivity of detection and sufficient reduction in the damping in the third area R3 can be achieved.

In the case of the third area R3, the parameters in the formulae can be understood as follows. That is, H [μm] is the length along the Z-axis of the penetration hole 30 arranged in the third part 32C, a [μm] is half the length along the Y-axis direction of the third part 32C of the second mass part

322, L [μm] is the length along the X-axis direction, h [μm] is the length along the Z-axis direction of the distance between the electrode 8 provided at the substrate 2 and the third part 32C, that is, the third gap Q3, S0 [μm] is the length of one side of the square of the penetration hole 30 arranged in the third part 32C, S1 [μm] is the space between the penetration holes 30 next to each other in the third part 32C, p [kg/ms] is the viscous resistance (coefficient of viscosity) of a gas in the third gap Q3, that is, a gas that fills the accommodation space S, and C is the damping generated in the third part 32C.

In this embodiment, the length h in the Z-axis direction of the gap Q is in the relationship of the first area R1<the second area R2<the third area R3. Therefore, the length S0 of one side of the penetration hole 30 is in the relationship of the first area R1<the second area R2<the third area R3, and the space S1 between the penetration holes 30 next to each other is in the relationship of the first area R1<the second area R2<the third area R3 accordingly.

In this way, preferably, the formula (12) is satisfied in all of the first area R1, the second area R2, and the third area R3. Thus, the damping can be sufficiently reduced in each of the first area R1, the second area R2, and the third area R3, that is, substantially in the entire area of the moving member 32. Therefore, as a whole, the damping can be effectively reduced. Thus, the physical quantity sensor 1 having a high sensitivity of detection and securing a desired frequency range can be provided.

However, the physical quantity sensor 1 is not limited to this example. The formula (13) may be satisfied in at least one of the first area R1, the second area R2, and the third area R3. When the formula (13) is satisfied in a part of the first area R1, the second area R2, and the third area R3, preferably, the area where the formula (13) is satisfied includes at least the first area R1. The influence of the damping becomes prominent as the length h of the gap Q becomes shorter. Therefore, when the formula (13) is satisfied in the first area R1 having the shortest length h of the gap Q, of the first area R1, the second area R2, and the third area R3, the overall damping can be effectively reduced.

In each of the first, second, and third areas R1, R2, R3, the length H in the Z-axis direction of the penetration hole 30, that is, the thickness of the moving member 32, is not particularly limited. However, preferably, the length H is, for example, 5.0 μm or longer and 80.0 μm or shorter. Thus, the moving member 32 that is sufficiently thin while maintaining mechanical strength is provided. Therefore, miniaturization of the physical quantity sensor 1 can be achieved. The length h of the gap Q is not particularly limited but is preferably, for example, 1.0 μm or longer and 3.5 μm or shorter. Thus, a sufficient movement range of the moving member 32 is secured and sufficiently high electrostatic capacitances Ca, Cb are provided. The length S0 is not particularly limited and varies depending on the length a, L. However, the length S0 is preferably, for example, 5 μm or longer and 40 μm or shorter, and more preferably 10 μm or longer and 30 μm or shorter.

The physical quantity sensor 1 has been described. As described above, such a physical quantity sensor 1 has the substrate 2 and the moving member 32 facing the substrate 2 in the Z-axis direction via the gap Q and becoming displaced in the Z-axis direction in relation to the substrate 2, where the Y-axis direction as the first direction, the X-axis direction as the second direction, and the Z-axis direction as the third direction are provided as three directions orthogonal to each other. The gap Q includes the first gap Q1 and the second gap Q2 having a longer distance between the substrate 2 and the moving member 32 than the first gap Q1. The moving member 32 has the first part 32A overlapping the first gap Q1 and the second part 32B overlapping the second gap Q2, as viewed in a plan view from the Z-axis direction, and the plurality of penetration holes 30 arranged in the first part 32A and the second part 32B, penetrating the moving member 32 in the Z-axis direction, and having a square opening shape as viewed from the Z-axis direction. In at least one of the first area R1 overlapping the first part 32A and the second area R2 overlapping the second part 32B, as viewed in a plan view from the Z-axis direction, the formula (13) is satisfied. Thus, the plurality of penetration holes 30 are appropriately designed and the damping can be sufficiently reduced while a high sensitivity of detection is achieved. Therefore, the physical quantity sensor 1 having a high sensitivity of detection and securing a desired frequency range is provided.

As described above, in the physical quantity sensor 1, the formula (13) is satisfied at least in the first area R1. The influence of the damping becomes prominent as the length h of the gap Q becomes shorter. Therefore, when the formula (13) is satisfied in the first area R1 having the shortest length h of the gap Q, of the first area R1, the second area R2, and the third area R3, the overall damping can be reduced more effectively.

As described above, in the physical quantity sensor 1, the formula (13) is satisfied in both of the first area R1 and the second area R2. Thus, the foregoing effects become more prominent and the damping can be reduced more effectively.

As described above, the element part 3 has the fixed part 31 fixed to the substrate 2, and the support beam 33 coupling the moving member 32 and the fixed part 31 together and forming the rotation axis J along the Y-axis direction. The moving member 32 is displaceable about the rotation axis J and has the first mass part 321 located at one side of the X-axis direction, as viewed in a plan view from the Z-axis direction, and the second mass part 322 located at the other side and having a greater moment of rotation about the rotation axis J than the first mass part 321. The second mass part 322 has the first part 32A and the second part 32B located at a more distant position from the rotation axis J than the first part 32A. Since the first part 32A having the shorter length h is arranged on the near side from the rotation axis J and the second part 32B having the longer length h is arranged on the side farther from the rotation axis J than the first part 32A in this way, the contact between the moving member 32 and the substrate 2 when the moving member 32 rotates about the rotation axis J can be effectively restrained.

As described above, the first mass part 321 has the first part 32A. The first part 32A of the first mass part 321 and the first part 32A of the second mass part 322 are arranged symmetrically with each other about the rotation axis J, as viewed in a plan view from the Z-axis direction. Thus, the device configuration of the physical quantity sensor 1 is simplified.

As described above, in the physical quantity sensor 1, preferably, the formula (14) is satisfied in at least one of the first area R1 and the second area R2. More preferably, the formula (15) is satisfied. Even more preferably, the formula (16) is satisfied. Thus, the physical quantity sensor 1 exhibiting the foregoing effects more prominently, having a high sensitivity of detection, and securing a desired frequency range is provided.

As described above, in the physical quantity sensor 1, preferably, the formula (17) is satisfied in at least one of the first area R1 and the second area R2. More preferably, the formula (18) is satisfied. Even more preferably, the formula

(19) is satisfied. Thus, a sufficiently high sensitivity of detection and sufficiently low damping can be achieved.

In this embodiment, with respect to the design of the penetration hole 30, the case where the penetration hole 30 has a square lateral cross-sectional shape is described. However, the penetration hole 30 having a circular lateral cross-sectional shape has the same effect. Specifically, it is the case where a circular penetration hole has a radius as expressed by the formula (9) and where the distance between the centers of penetration holes is twice the value of the formula (8). Also, the penetration hole 30 has a similar effect even when the lateral cross-sectional shape of the penetration hole 30 is a polygon with an area change of ±25% from the area of the square under the optimum condition (S0=S0min), for example, a triangle, a quadrilateral that is not a square, or a pentagon or other polygons having more sides.

In this embodiment, the gap Q includes the first gap Q1, the second gap Q2, and the third gap Q3 having different lengths h from each other. The configuration of the gap Q is not particularly limited, provided that the gap Q includes the first gap Q1 and the second gap Q2 having different lengths h from each other.

For example, as shown in FIG. 23, a configuration where the gap Q has the first gap Q1 and the second gap Q2 having different lengths h from each other, with the first gap Q1 overlapping the first mass part 321 and the base part 322' of the second mass part 322, and the second gap Q2 overlapping the torque generation part 322" of the second mass part 322, may be employed. The dimension of each part may be designed in such a way as to satisfy the formula (13) in each of the areas R1, R2, where the part overlapping the first gap Q1, of the first and second mass parts 321, 322, is referred to as the first part 32A, the part overlapping the second gap Q2 is referred to as the second part 32B, the area overlapping the first part 32A is referred to as the first area R1, and the area overlapping the second part 32B is referred to as the second area R2, as viewed in a plan view from the Z-axis direction.

Also, as shown in FIG. 24, a configuration where the gap Q includes the first gap Q1, the second gap Q2, the third gap Q3, and a fourth gap Q4 having different lengths h from each other, with the first and second gaps Q1, Q2 overlapping the first mass part 321 and the base part 322' of the second mass part 322, and the third and fourth gaps Q3, Q4 overlapping the torque generation part 322" of the second mass part 322, may be employed. The dimension of each part may be designed in such a way as to satisfy the formula (13) in each of the areas R1, R2, R3, R4, where the part overlapping the first gap Q1, of the first and second mass parts 321, 322, is referred to as the first part 32A, the part overlapping the second gap Q2 is referred to as the second part 32B, the part overlapping the third gap Q3 is referred to as the third part 32C, the part overlapping the fourth gap Q4 is referred to as a fourth part 32D, the area overlapping the first part 32A is referred to as the first area R1, the area overlapping the second part 32B is referred to as the second area R2, the area overlapping the third part 32C is referred to as the third area R3, and the area overlapping the fourth part 32D is referred to as the fourth area R4, as viewed in a plan view from the Z-axis direction.

When the gap Q includes a greater number of gaps having different lengths h from each other, the step formed at the bottom surface of the recess 21 becomes smaller and the coverage in depositing the electrode 8 at this step is improved. Therefore, disconnection or the like of the electrode 8 can be effectively restrained. However, the number of processes of forming the recess 21 increases, which may lead to increase in the cost of the physical quantity sensor 1. Meanwhile, when the gap Q includes a smaller number of gaps having different lengths h from each other, the number of processes of forming the recess 21 decreases and the cost of the physical quantity sensor 1 can be reduced. However, the step formed at the bottom surface of the recess 21 becomes larger and the coverage in forming the electrode 8 at this step drops. Therefore, disconnection or the like of the electrode 8 may be more likely to occur. Thus, preferably, the number of gaps having different lengths h from each other, included in the gap Q, is approximately 3 to 6. This can achieve both of improvement in coverage and cost reduction in a well-balanced manner.

Second Embodiment

Figure 25:
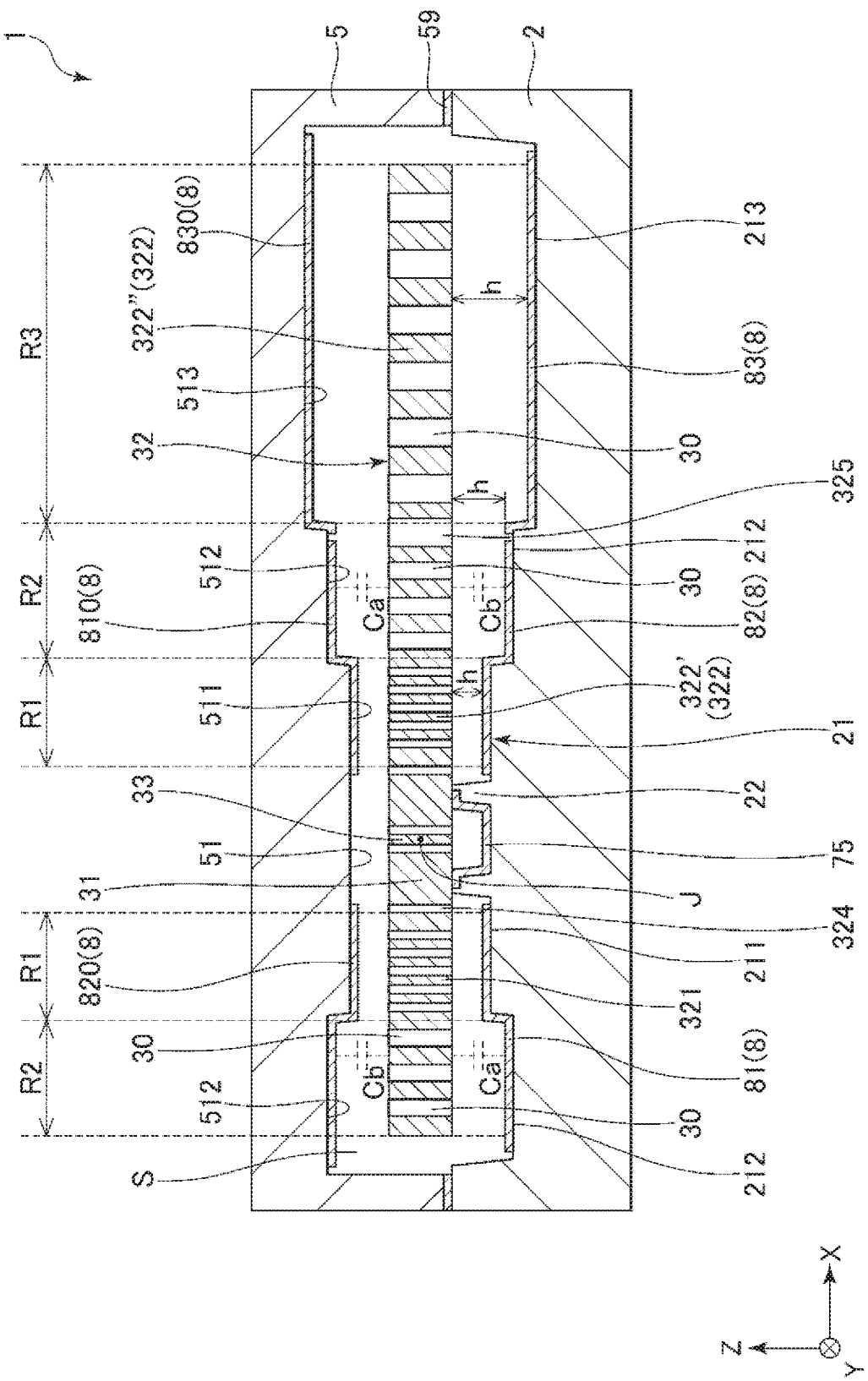
FIG. 25 is a cross-sectional view showing a physical quantity sensor according to a second embodiment.

FIG. 25 is a cross-sectional view showing a physical quantity sensor according to a second embodiment.

This embodiment is similar to the first embodiment except that the configuration of the electrode 8 is different. In the description below, this embodiment is described mainly in terms of the difference from the first embodiment and the description of similar matters is omitted. In FIG. 25, components similar to those in the first embodiment are denoted by the same reference numbers.

As shown in FIG. 25, in the physical quantity sensor according to this embodiment, a recess 51 has a first recess 511, a second recess 512 located at both sides of the X-axis direction of the first recess 511 and deeper than the first recess 511, and a third recess 513 located at the positive side of the X-axis direction of the second recess 512 and deeper than the second recess 512. The first recess 511 is arranged symmetrically with the first recess 211 about the moving member 32. The second recess 512 is arranged symmetrically with the second recess 212 about the moving member 32. The third recess 513 is arranged symmetrically with the third recess 213 about the moving member 32.

The electrode 8 includes a first fixed electrode 810, a second fixed electrode 820, and a dummy electrode 830 that are arranged at the bottom surface of the recess 51. The first fixed electrode 810 is arranged symmetrically with the second fixed electrode 82 about the moving member 32. The second fixed electrode 820 is arranged symmetrically with the first fixed electrode 81 about the moving member 32. The dummy electrode 830 is arranged symmetrically with the dummy electrode 83 about the moving member 32.

The first fixed electrodes 81, 810 are electrically coupled together. The second fixed electrodes 82, 820 are electrically coupled together. The dummy electrodes 83, 830 are electrically coupled together. Therefore, the electrostatic capacitance Ca is also formed between the moving member 32 and the first fixed electrode 810. The electrostatic capacitance Cb is also formed between the moving member 32 and the second fixed electrode 820.

In such a configuration, the electrostatic capacitances Ca, Cb formed between the moving member 32 and the electrode 8 are double the electrostatic capacitances Ca, Cb in the first embodiment. Also, the damping C due to the gas between the moving member 32 and the bottom surface of the recess 51 can be reduced more effectively. Therefore, the accuracy of detecting the acceleration Az by the physical quantity sensor 1 is improved further.

Such a second embodiment can achieve effects similar to those in the first embodiment.

Third Embodiment

Figure 26:
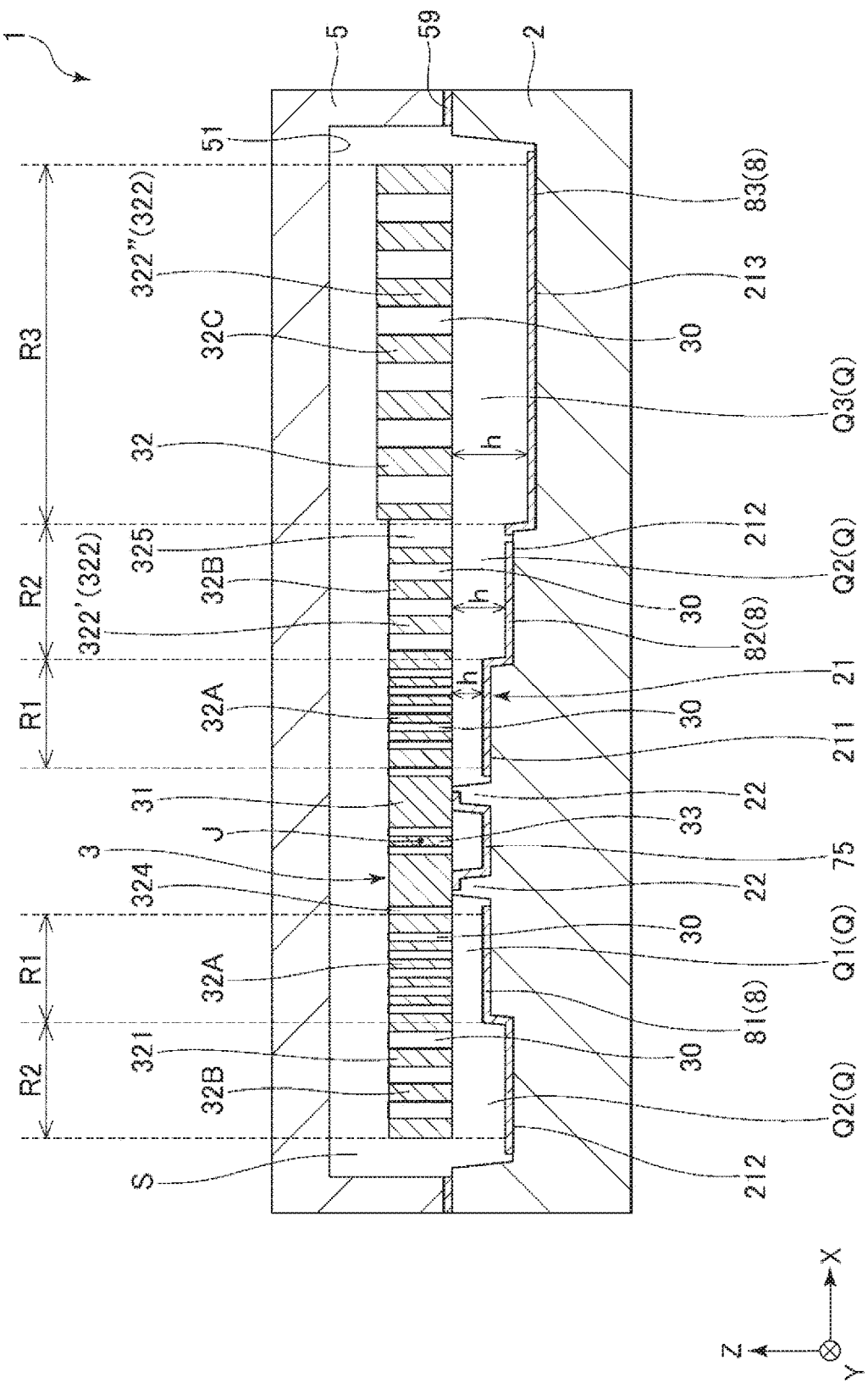
FIG. 26 is a cross-sectional view showing a physical quantity sensor according to a third embodiment.

FIG. 26 is a cross-sectional view showing a physical quantity sensor according to a third embodiment.

This embodiment is similar to the first embodiment except that the configuration of the element part 3 is different. In the description below, this embodiment is described mainly in terms of the difference from the first embodiment and the description of similar matters is omitted. In FIG. 26, components similar to those in the first embodiment are denoted by the same reference numbers.

As shown in FIG. 26, in the physical quantity sensor 1 according to this embodiment, the moving member 32 has parts with different thicknesses, that is, different lengths in the Z-axis direction. Specifically, in the moving member 32, the torque generation part 322″ of the second mass part 322 has a greater thickness than the other parts, that is, the base part 322′, the first mass part 321, and the coupling part 323. Thus, the mass of the torque generation part 322″ is greater and the accuracy of detecting the acceleration Az is higher, for example, than in the first embodiment.

Such a third embodiment can achieve effects similar to those in the first embodiment.

Fourth Embodiment

Figure 27:
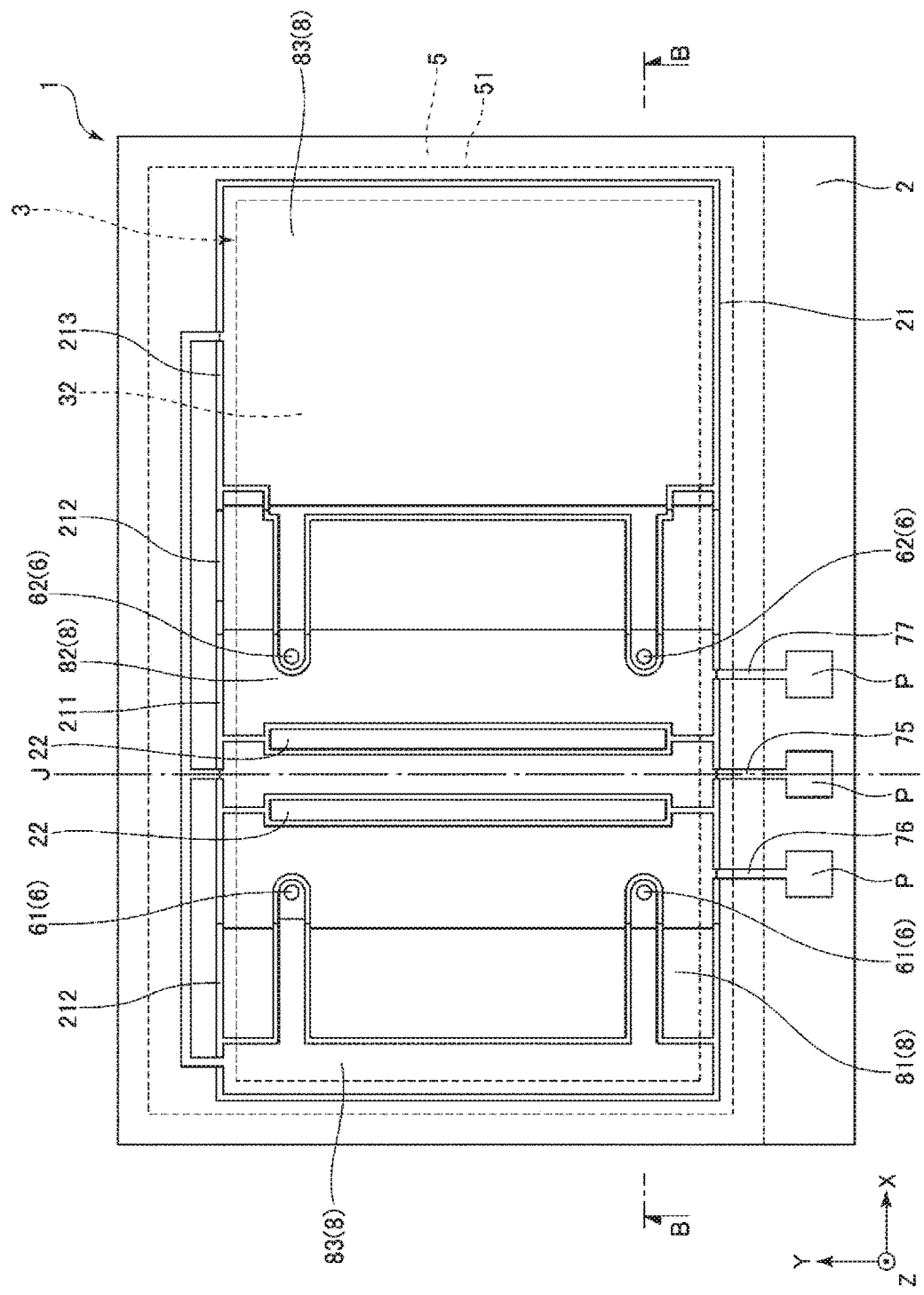
FIG. 27 is a plan view showing a physical quantity sensor according to a fourth embodiment.
Figure 28:
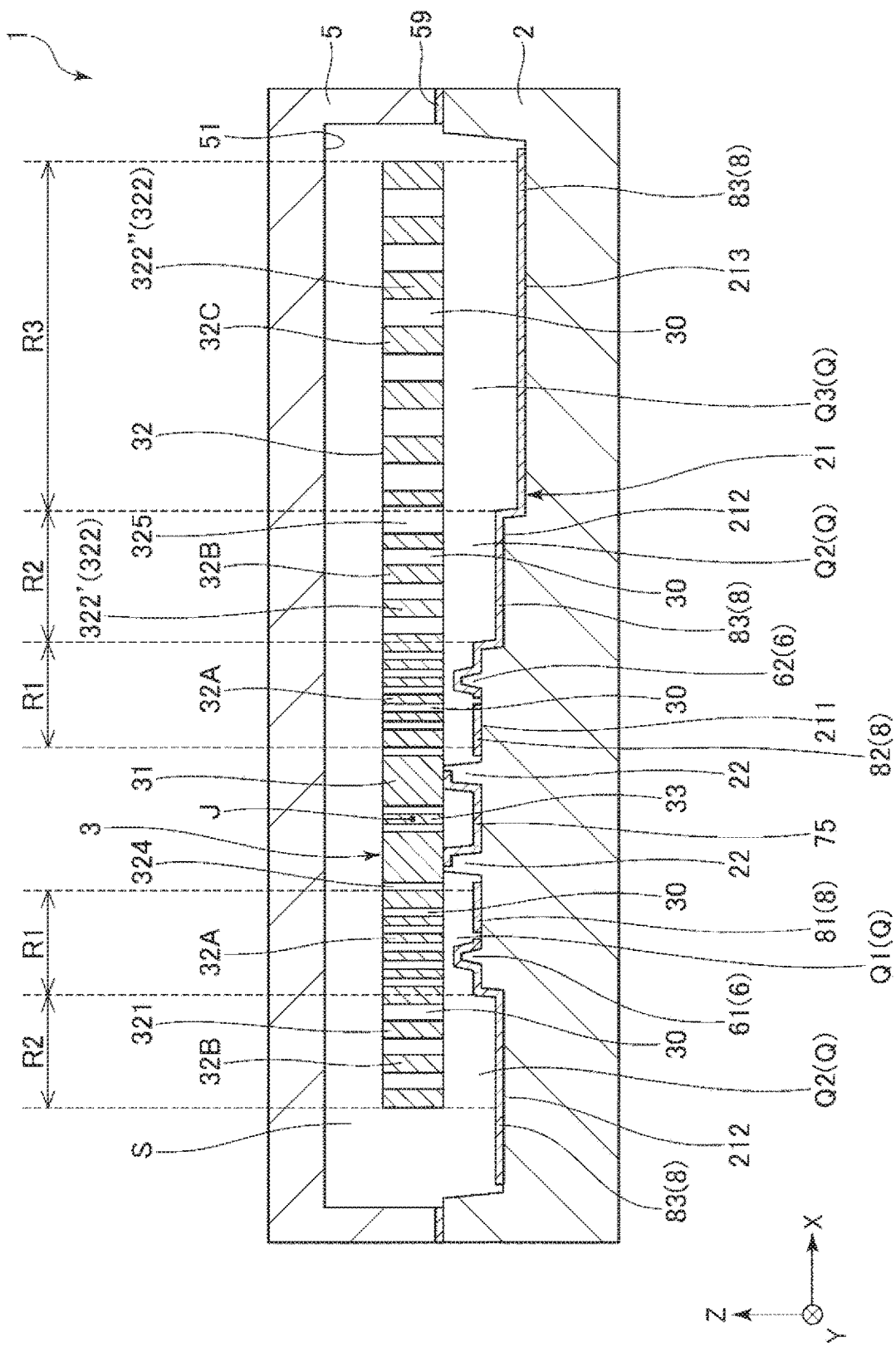
FIG. 28 is a cross-sectional view taken along B-B in FIG. 27.

FIG. 27 is a plan view showing a physical quantity sensor according to a fourth embodiment. FIG. 28 is a cross-sectional view taken along B-B in FIG. 27.

This embodiment is similar to the first embodiment except that a stopper is provided at the substrate 2. In the description below, this embodiment is described mainly in terms of the difference from the first embodiment and the description of similar matters is omitted. In FIGS. 27 and 28, components similar to those in the first embodiment are denoted by the same reference numbers.

As shown in FIGS. 27 and 28, the physical quantity sensor 1 according to this embodiment has a protrusion 6 protruding from the bottom surface of the recess 21 of the substrate 2 toward the moving member 32. In this embodiment, the protrusion 6 is provided in a plural number and each protrusion 6 is formed integrally with the substrate 2.

When the moving member 32 swings excessively, the protrusion 6 comes into contact with the moving member 32 and thus functions as a stopper to regulate further swinging of the moving member 32. As such a protrusion 6 is provided, the moving member 32 and the first and second fixed electrodes 81, 82 having different electric potentials from each other can be restrained from excessively approaching each other or coming into contact with each other over a broad area. Therefore, the occurrence of a "sticking" of the moving member 32 remaining attracted to the first and second fixed electrodes 81, 82 and not returning to the original position due to the electrostatic attraction generated between the moving member 32 and the first and second fixed electrode 81, 82 can be effectively restrained.

The protrusion 6 includes a protrusion 61 provided overlapping the first mass part 321, and a protrusion 62 provided overlapping the second mass part 322, as viewed in a plan view from the Z-axis direction. Each of the protrusions 61, 62 is provided in a pair spaced apart in the Y-axis direction. The pair of protrusions 61 and the pair of protrusions 62 are arranged symmetrically with each other about the rotation axis J, as viewed in a plan view from the Z-axis direction. Of these protrusions, the protrusion 61 has the function of restraining the moving member 32 and the first fixed electrode 81 from excessively approaching each other, and the protrusion 62 has the function of restraining the moving member 32 and the second fixed electrode 82 from excessively approaching each other. The protrusions 61, 62 are configured similarly and are provided symmetrically about the rotation axis J, as viewed in a plan view from the Z-axis direction.

The protrusions 61, 62 are covered with the dummy electrode 83 having the same electric potential as the moving member 32. This configuration can restrain charging on the surface of the protrusions 61, 62 due to the migration of alkali metal ions in the substrate 2. Therefore, the occurrence of an unintended electrostatic attraction that may lead to a malfunction of the moving member 32, particularly, a displacement by an external force other than the acceleration Az as a detection target, can be effectively restrained. Thus, the physical quantity sensor 1 can detect the acceleration Az more accurately.

Such a fourth embodiment can achieve effects similar to those in the first embodiment.

Fifth Embodiment

Figure 29:
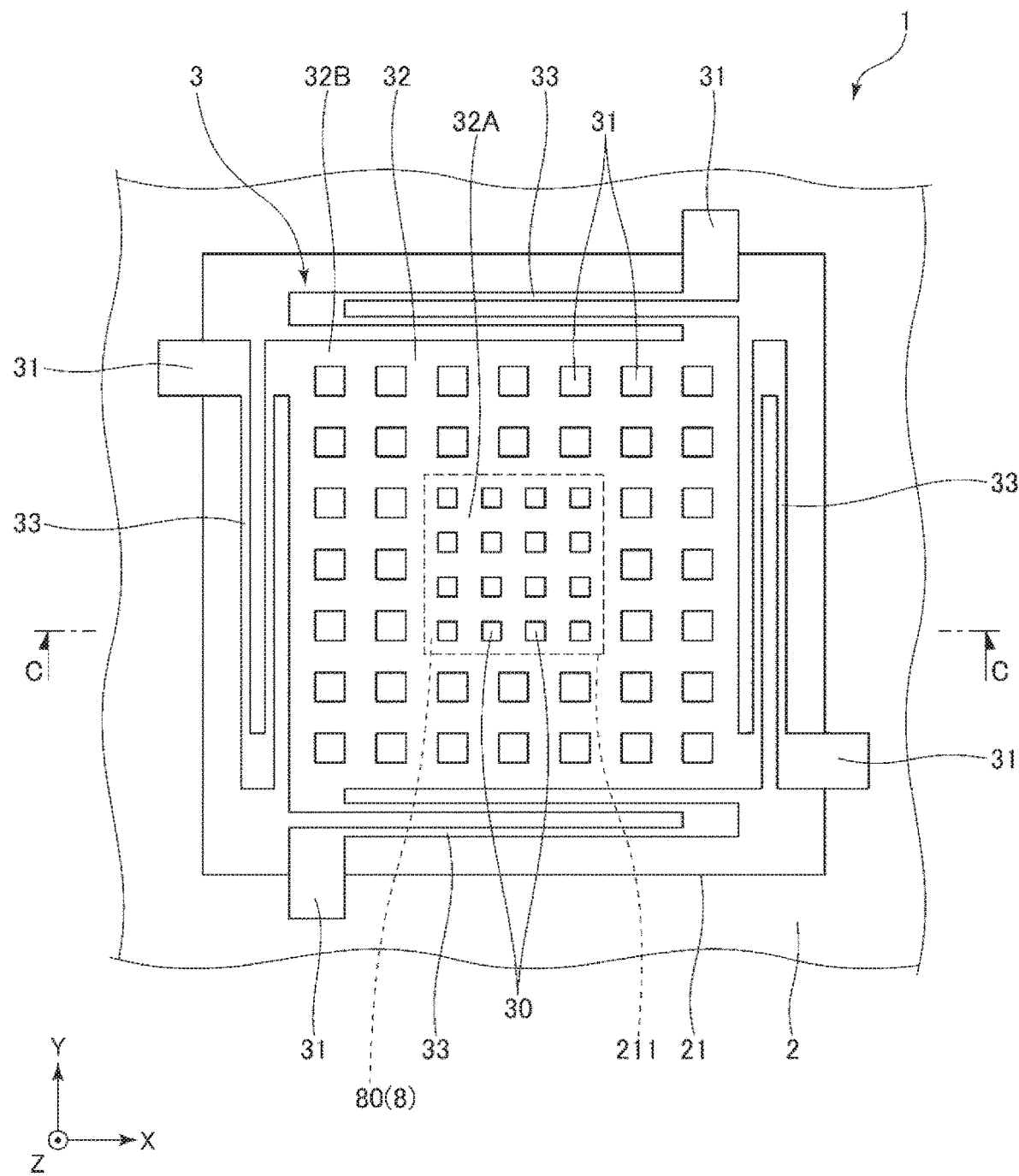
FIG. 29 is a plan view showing a physical quantity sensor according to a fifth embodiment.
Figure 30:
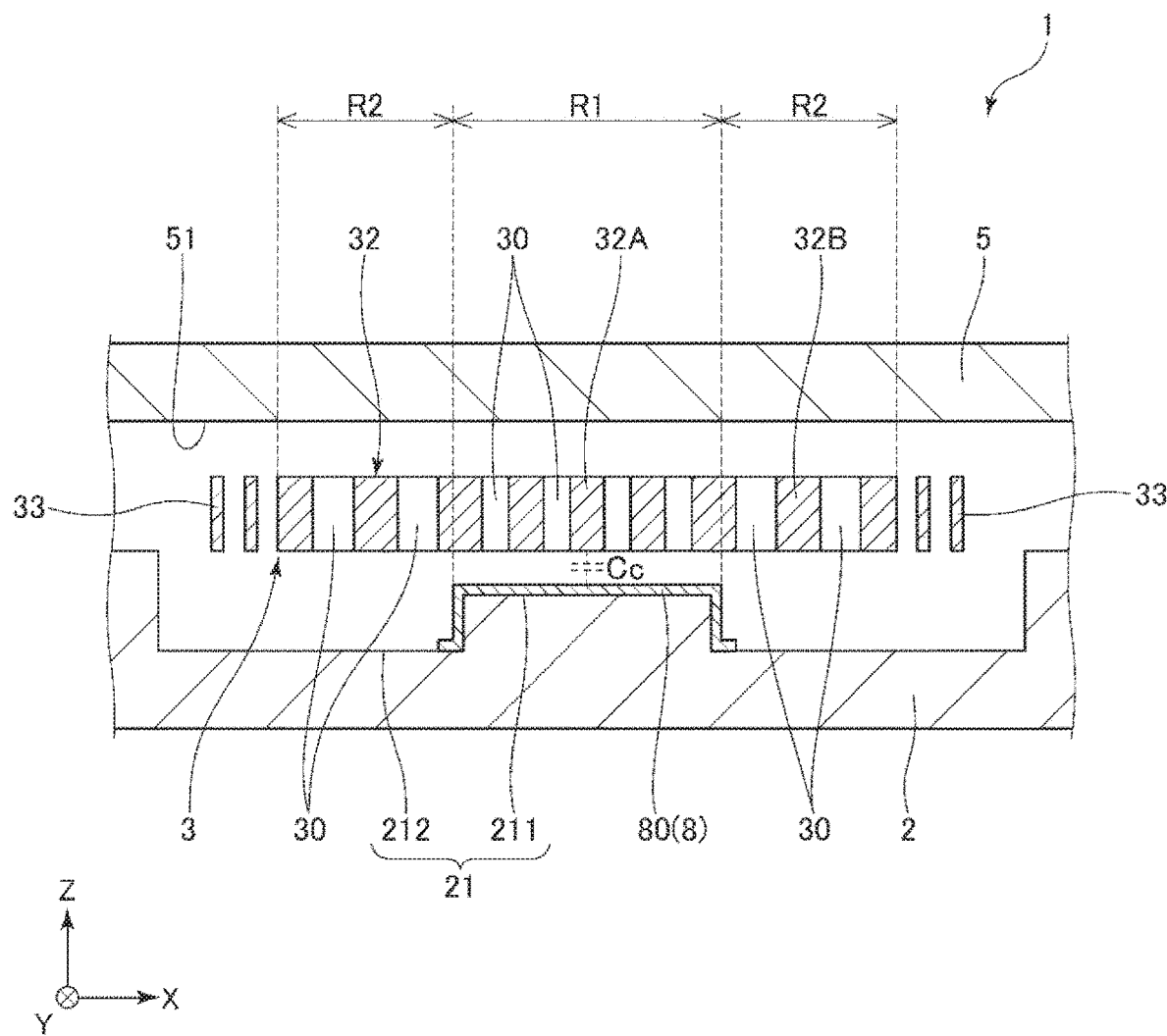
FIG. 30 is a cross-sectional view taken along C-C in FIG. 29.

FIG. 29 is a plan view showing a physical quantity sensor according to a fifth embodiment. FIG. 30 is a cross-sectional view taken along C-C in FIG. 29.

This embodiment is similar to the first embodiment except that the configurations of the element part 3 and the substrate 2 are different. In the description below, this embodiment is described mainly in terms of the difference from the first embodiment and the description of similar matters is omitted. In FIGS. 29 and 30, components similar to those in the first embodiment are denoted by the same reference numbers.

As shown in FIG. 29, in the physical quantity sensor 1 according to this embodiment, the element part 3 has the moving member 32, four fixed parts 31 fixed to the substrate 2, and four support beams 33 coupling each fixed part 31 and the moving member 32 together. The moving member 32 is configured to be translated in the Z-axis direction in relation to the substrate 2. Meanwhile, as shown in FIG. 30, in the substrate 2, the recess 21 includes the first recess 211 and the second recess 212 in the shape of a frame surrounding the first recess 211 and deeper than the first recess 211. A fixed electrode 80 is arranged at the bottom surface of the first recess 211. An electrostatic capacitance Cc is formed between the fixed electrode 80 and the moving member 32. When the acceleration Az is applied, the moving member 32 is translated in the Z-axis direction, thus changing the electrostatic capacitance Cc. Therefore, the acceleration Az can be detected, based on the change in the electrostatic capacitance Cc.

The first recess 211 overlaps a center part of the moving member 32, and the second recess 212 overlaps an edge part of the moving member 32, as viewed in a plan view from the Z-axis direction. Therefore, the center part overlapping the first recess 211, of the moving member 32, is the first part 32A. The edge part overlapping the second recess 212, of the moving member 32, is the second part 32B. The dimension of each part is designed to satisfy the formula (13) in each of the first area R1 overlapping the first part 32A and the second area R2 overlapping the second part 32B, as viewed in a plan view from the Z-axis direction.

Such a fifth embodiment can achieve effects similar to those in the first embodiment.

Sixth Embodiment

Figure 31:
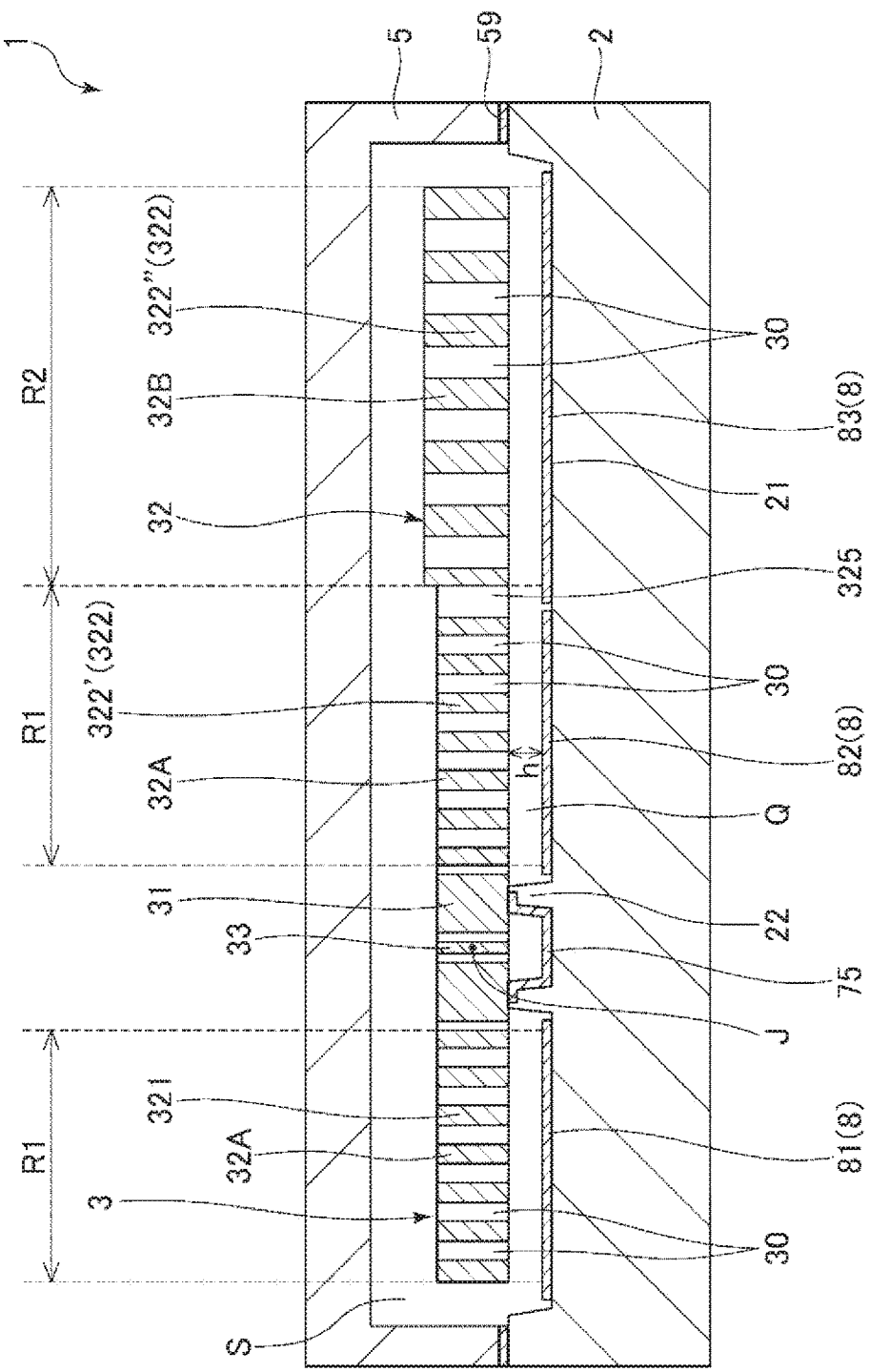
FIG. 31 is a cross-sectional view showing a physical quantity sensor according to a sixth embodiment.

FIG. 31 is a cross-sectional view showing a physical quantity sensor according to a sixth embodiment.

This embodiment is similar to the first embodiment except that the configurations of the element part 3 and the substrate 2 are different. In the description below, this embodiment is described mainly in terms of the difference from the first embodiment and the description of similar matters is omitted. In FIG. 31, components similar to those in the first embodiment are denoted by the same reference numbers.

As shown in FIG. 31, in the physical quantity sensor 1 according to this embodiment, the bottom surface of the recess 21 of the substrate 2 is a planar surface. Therefore, the gap Q between the bottom surface of the recess 21 and the element part 3 has an equal length h over the entire area.

The moving member 32 has a configuration similar to that in the third embodiment and therefore has parts with different thicknesses, that is, different lengths in the Z-axis direction. Specifically, of the moving member 32, the torque generation part 322" of the second mass part 322 has a greater thickness than the other parts, that is, the base part 322', the first mass part 321, and the coupling part 323. Thus, the mass of the torque generation part 322" is greater and the accuracy of detecting the acceleration Az is higher, for example, than in the first embodiment. In this case, the base part 322' and the first mass part 321 are the first part 32A, and the torque generation part 322" is the second part 32B. The area overlapping the first part 32A is the first area R1, and the area overlapping the second part 32B is the second area R2, as viewed in a plan view from the Z-axis direction. The dimension of each part is designed to satisfy the formula (13) in each of the first area R1 and the second area R2.

The physical quantity sensor 1 according to this embodiment has been described. As described above, such a physical quantity sensor 1 has the substrate 2 and the moving member 32 facing the substrate 2 in the Z-axis direction via the gap Q and becoming displaced in the Z-axis direction in relation to the substrate 2, where the Y-axis direction as the first direction, the X-axis direction as the second direction, and the Z-axis direction as the third direction are provided as three directions orthogonal to each other. The moving member 32 has the first part 32A, the second part 32B having a greater length in the Z-axis direction than the fixed part 31, and the plurality of penetration holes 30 arranged in the first part 32A and the second part 32B, penetrating the moving member 32 in the Z-axis direction, and having a square opening shape as viewed from the Z-axis direction. In at least one of the first area R1 overlapping the first part 32A and the second area R2 overlapping the second part 32B, as viewed in a plan view from the Z-axis direction, the formula (13) is satisfied. Thus, the plurality of penetration holes 30 are appropriately designed and the damping can be sufficiently reduced while a high sensitivity of detection is achieved. Therefore, the physical quantity sensor 1 having a high sensitivity of detection and securing a desired frequency range is provided.

Seventh Embodiment

Figure 32:
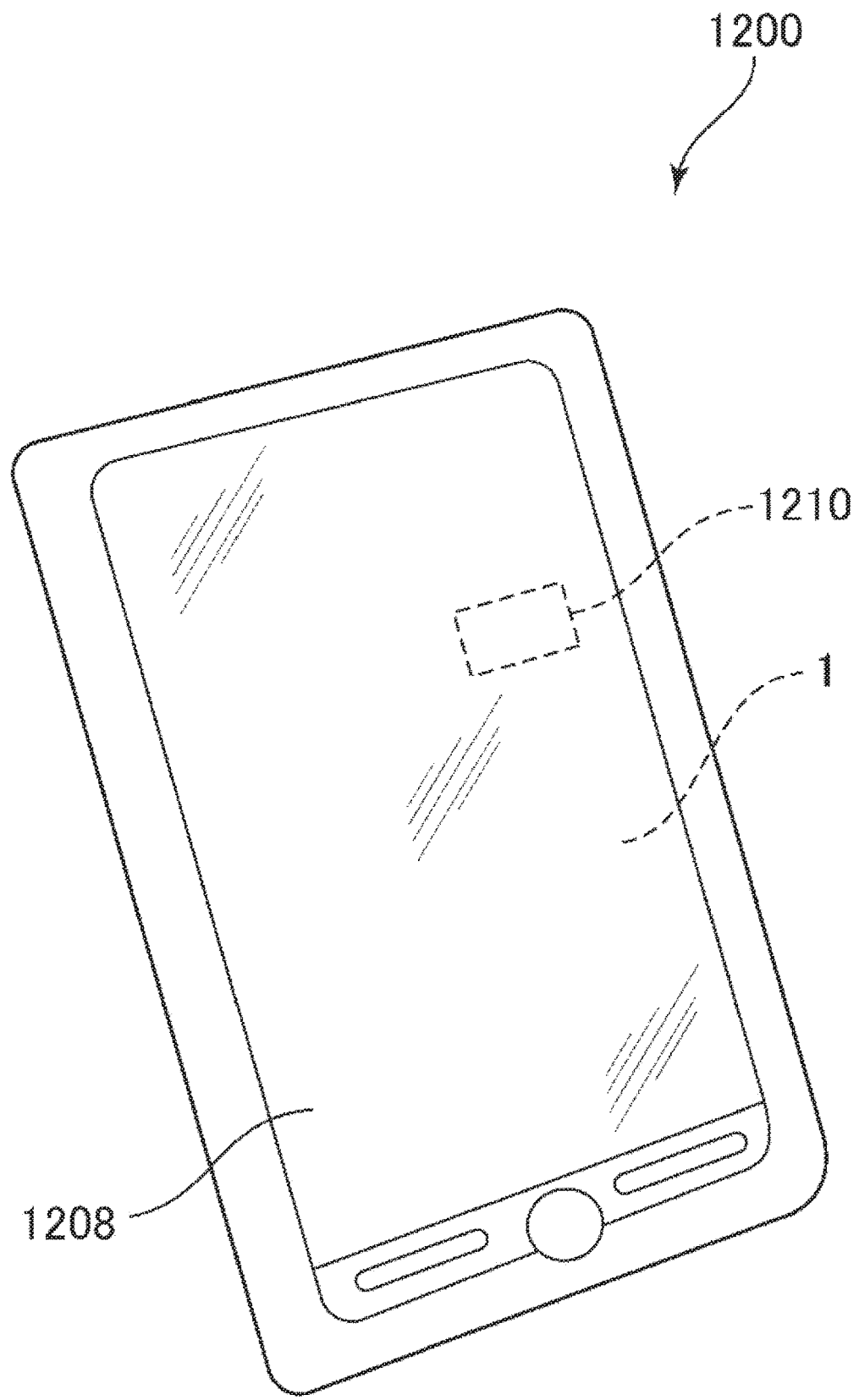
FIG. 32 is a plan view showing a smartphone as an electronic apparatus according to a seventh embodiment.

FIG. 32 is a plan view showing a smartphone as an electronic apparatus according to a seventh embodiment.

A smartphone 1200 shown in FIG. 32 is a smartphone to which the electronic apparatus according to the present disclosure is applied. The physical quantity sensor 1 and a control circuit 1210 performing control based on a detection signal outputted from the physical quantity sensor 1 are built in the smartphone 1200. Detection data detected by the physical quantity sensor 1 is transmitted to the control circuit 1210. The control circuit 1210 recognizes the attitude and behavior of the smartphone 1200, based on the received detection data, and can change a display image displayed at a display unit 1208, output a warning sound or a sound effect, and drive a vibration motor to vibrate the main body.

Such a smartphone 1200 as an electronic apparatus has the physical quantity sensor 1 and the control circuit 1210 performing control based on a detection signal outputted from the physical quantity sensor 1. Therefore, the smartphone 1200 has the effects of the physical quantity sensor 1 and achieves high reliability.

The electronic apparatus according to the present disclosure can be applied not only to the smartphone 1200 but also to a personal computer, digital still camera, tablet terminal, timepiece, smartwatch, inkjet printer, laptop personal computer, television, wearable terminal such as smart glasses or HMD (head-mounted display), video camera, videotape recorder, car navigation device, drive recorder, pager, electronic organizer, electronic dictionary, electronic translator, electronic calculator, electronic game device, toy, word processor, workstation, videophone, security monitor, electronic binoculars, POS terminal, medical equipment, fishfinder, various measuring devices, mobile terminal base station apparatus, various instruments for vehicle, railway train, aircraft, helicopter, ship and the like, flight simulator, network server, and the like.

Eighth Embodiment

Figure 33:
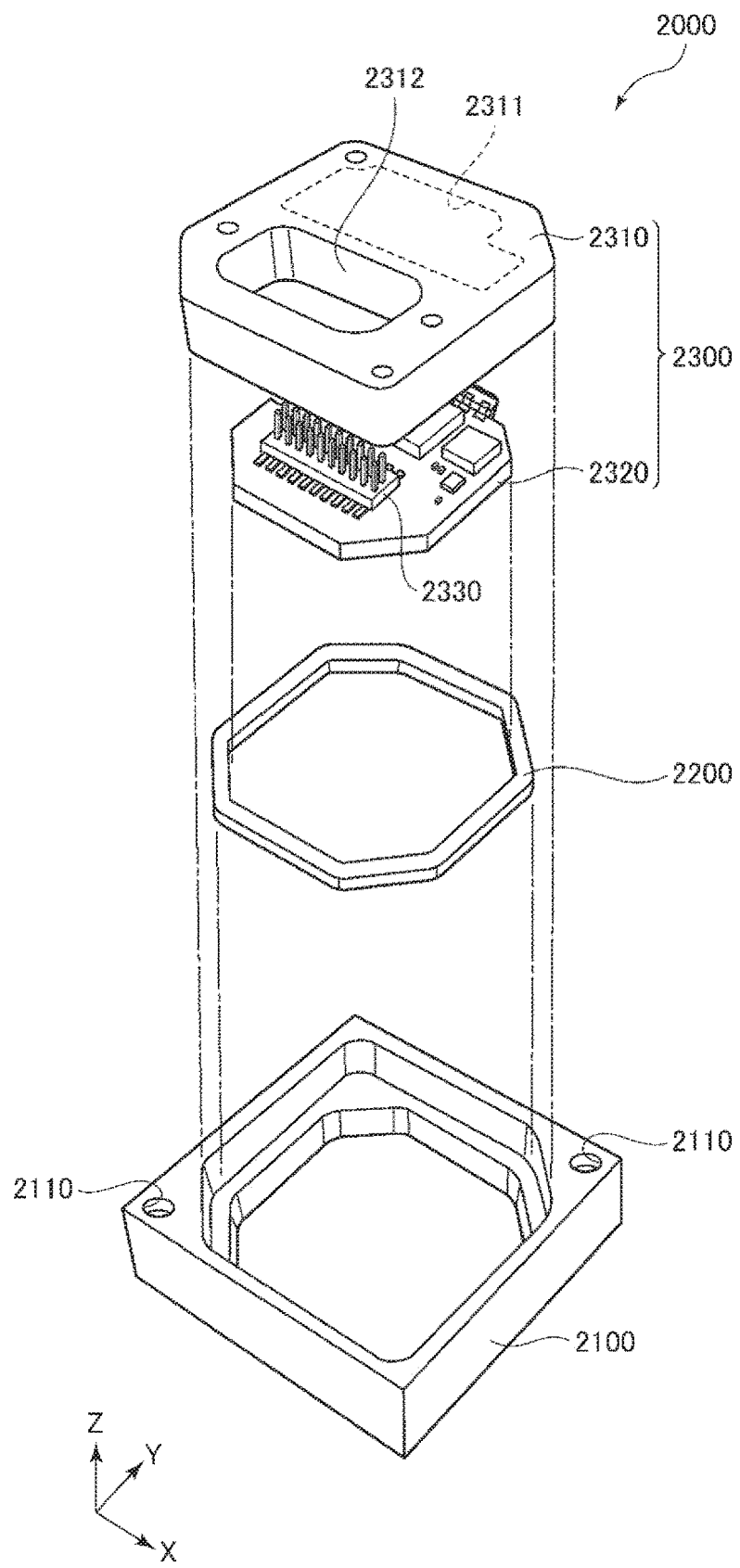
FIG. 33 is an exploded perspective view showing an inertial measurement unit as an electronic apparatus according to an eighth embodiment.
Figure 34:
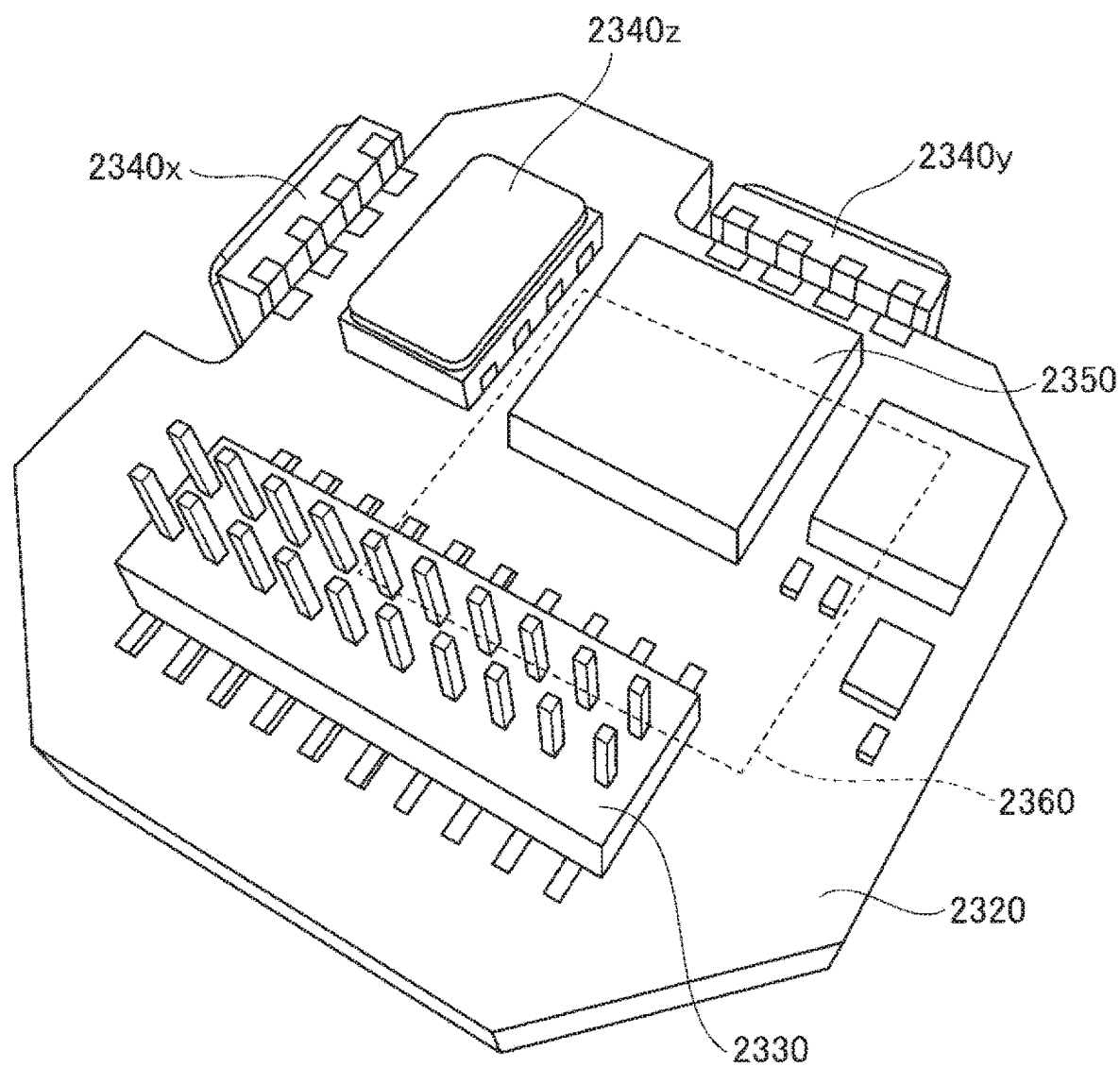
FIG. 34 is a perspective view of a substrate provided in the inertial measurement unit shown in FIG. 33.

FIG. 33 is an exploded perspective view showing an inertial measurement unit according to an eighth embodiment. FIG. 34 is a perspective view of a substrate provided in the inertial measurement unit shown in FIG. 33.

An inertial measurement unit 2000 (IMU) as an electronic device shown in FIG. 33 is an inertial measurement unit detecting an attitude and behavior of an installation target device such as an automobile or robot. The inertial measurement unit 2000 functions as a 6-axis motion sensor having a 3-axis acceleration sensor and a 3-axis angular velocity sensor.

The inertial measurement unit 2000 is a rectangular parallelepiped having a substantially square planar shape. A screw hole 2110 as a fixing part is formed near two vertices located along a diagonal line of the square. Two screws can be inserted into the two screw holes 2110 to fix the inertial measurement unit 2000 on an installation target surface of an installation target object such as an automobile. Properly selecting components or changing the design enables miniaturization of the inertial measurement unit 2000 into a size that can be installed, for example, in a smartphone or digital camera.

The inertial measurement unit 2000 has an outer case 2100, a bonding member 2200, and a sensor module 2300. The sensor module 2300 is inserted in the outer case 2100 via the bonding member 2200. The outer shape of the outer case 2100 is a rectangular parallelepiped having a substantially square planar shape, similarly to the overall shape of the inertial measurement unit 2000. The screw hole 2110 is formed near two vertices along a diagonal line of the square. The outer case 2100 is in the shape of a box, with the sensor module 2300 accommodated inside.

The sensor module 2300 has an inner case 2310 and a substrate 2320. The inner case 2310 is a member supporting the substrate 2320 and has a shape to fit inside the outer case 2100. In the inner case 2310, a recess 2311 for preventing contact with the substrate 2320 and an opening 2312 for exposing a connector 2330, described later, are formed. Such an inner case 2310 is bonded to the outer case 2100 via the bonding member 2200. The substrate 2320 is bonded to a lower surface of the inner case 2310 via an adhesive.

As shown in FIG. 34, the connector 2330, an angular velocity sensor 2340z detecting an angular velocity about the Z-axis, and an acceleration sensor 2350 detecting an acceleration in each of the X-axis, Y-axis, and Z-axis directions, and the like, are installed at an upper surface of the substrate 2320. On lateral surfaces of the substrate 2320, an angular velocity sensor 2340x detecting an angular velocity about the X-axis and an angular velocity sensor 2340y detecting an angular velocity about the Y-axis are installed. For example, the physical quantity sensor according to the present disclosure can be used as the acceleration sensor 2350.

A control IC 2360 is installed at a lower surface of the substrate 2320. The control IC 2360 is an MCU (micro controller unit) and controls each part of the inertial measurement unit 2000. In a storage unit, a program prescribing an order and content for detecting an acceleration and an angular velocity, a program for digitizing and incorporating detection data into packet data, and accompanying data and the like are stored. In addition, a plurality of other electronic components are installed at the substrate 2320.

Ninth Embodiment

Figure 35:
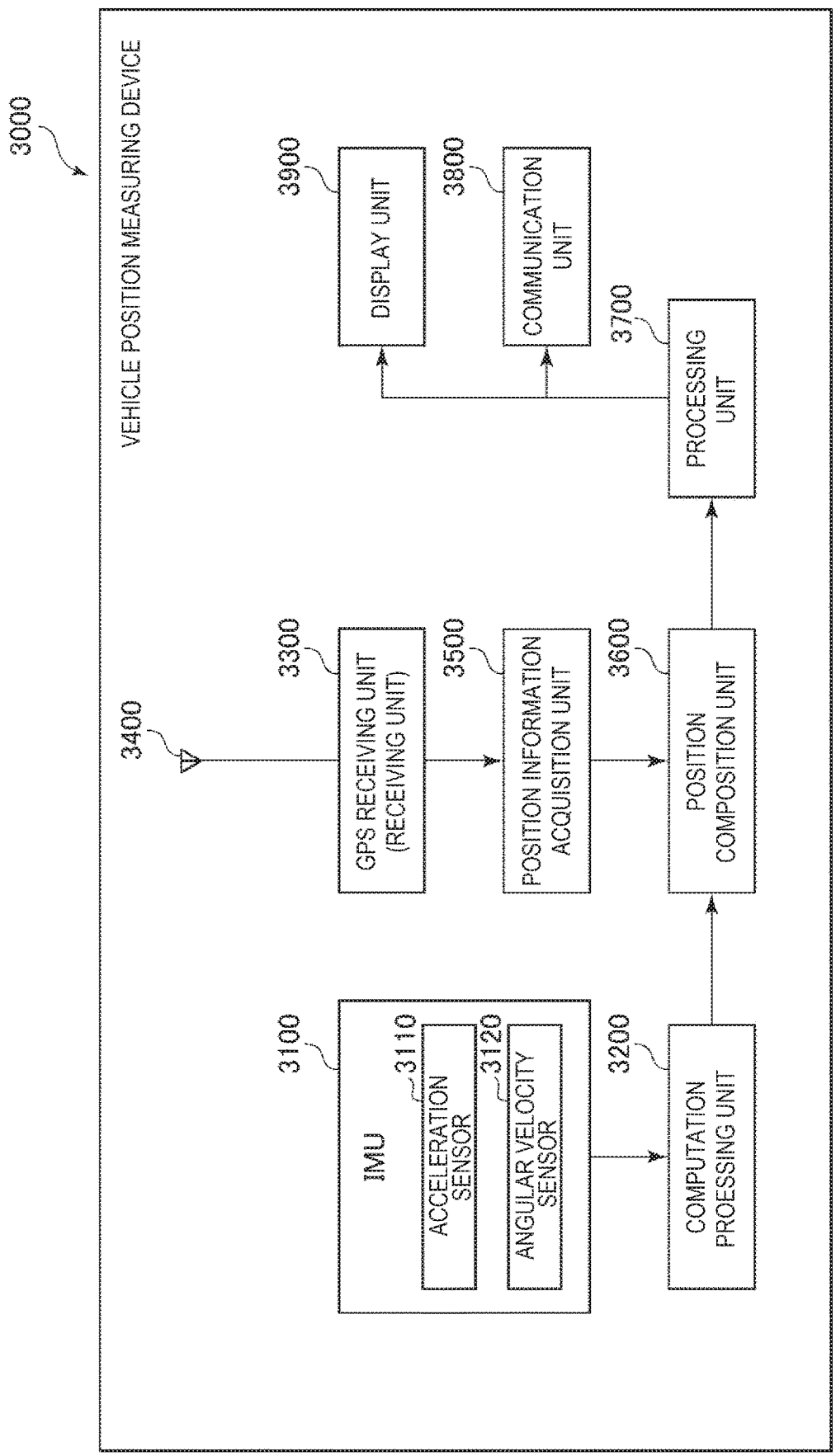
FIG. 35 is a block diagram showing an overall system of a vehicle position measuring device as an electronic apparatus according to a ninth embodiment.
Figure 36:
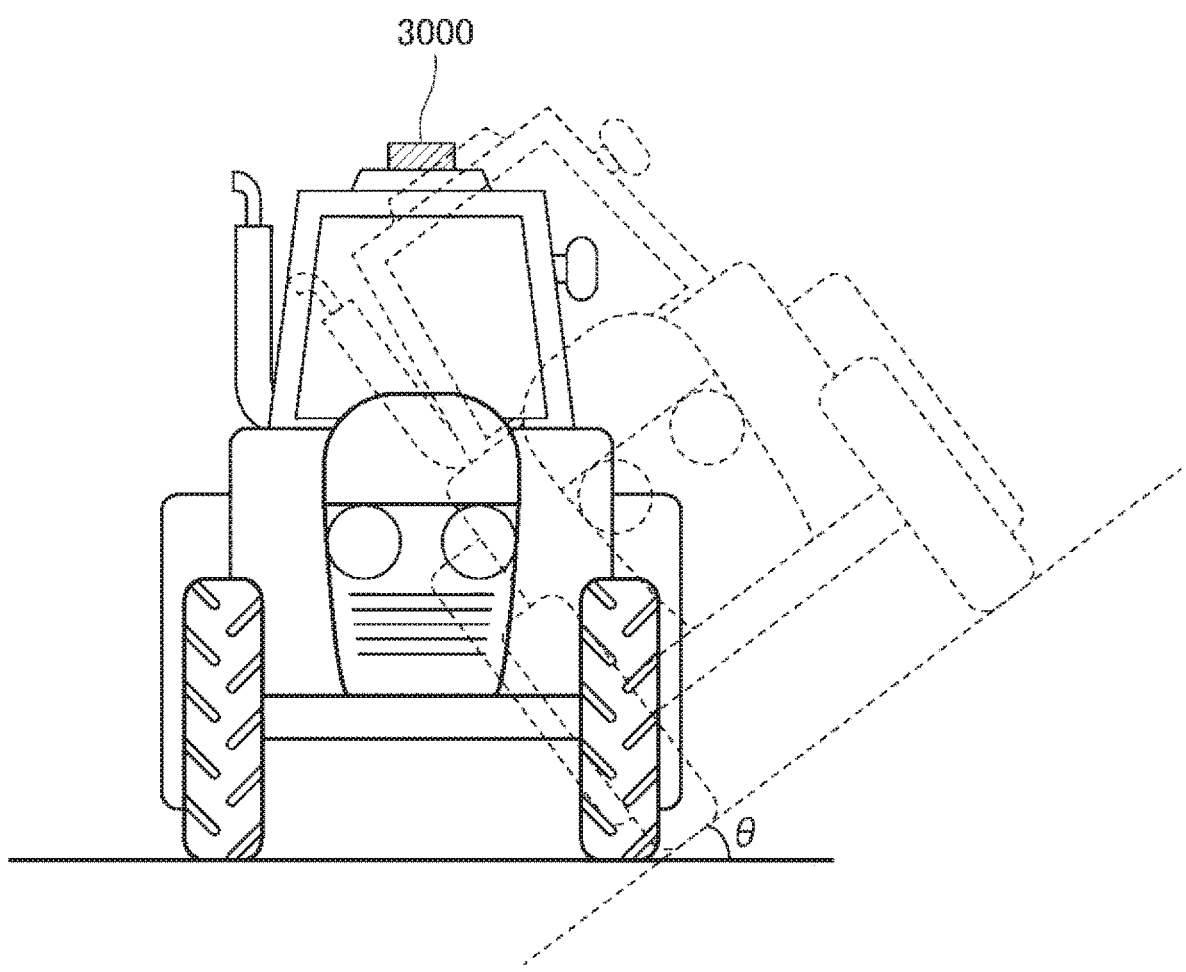
FIG. 36 shows an operation of the vehicle position measuring device shown in FIG. 35.

FIG. 35 is a block diagram showing an overall system of a vehicle position measuring device as an electronic apparatus according to a ninth embodiment. FIG. 36 shows an operation of the vehicle position measuring device shown in FIG. 35.

A vehicle position measuring device 3000 shown in FIG. 35 is a device installed and used on a vehicle in order to measure the position of the vehicle. The vehicle is not particularly limited and may be any of bicycle, automobile motorcycle, train, airplane, ship, and the like. In this embodiment, the case where a four-wheeled automobile, particularly an agricultural tractor, is used as the vehicle is described.

The vehicle position measuring device 3000 has an inertial measurement unit 3100 (IMU), a computation processing unit 3200, a GPS receiving unit 3300, a receiving antenna 3400, a position information acquisition unit 3500, a position composition unit 3600, a processing unit 3700, a communication unit 3800, and a display unit 3900. As the inertial measurement unit 3100, for example, the foregoing inertial measurement unit 2000 can be used.

The inertial measurement unit 3100 has an acceleration sensor 3110 for three axes and an angular velocity sensor 3120 for three axes. The computation processing unit 3200 receives acceleration data from the acceleration sensor 3110 and angular velocity data from the angular velocity sensor 3120, carries out inertial navigation processing on these data, and outputs inertial navigation positioning data including the acceleration and attitude of the vehicle.

The GPS receiving unit 3300 receives a signal from a GPS satellite via the receiving antenna 3400. The position information acquisition unit 3500 outputs GPS positioning data representing the position (latitude, longitude, altitude), velocity, and direction of the vehicle position measuring device 3000, based on the signal received by the GPS receiving unit 3300. The GPS positioning data also includes status data representing the receiving state, the time of reception, and the like.

The position composition unit 3600 calculates the position of the vehicle, specifically, which position on the ground the vehicle is travelling at, based on the inertial navigation positioning data outputted from the computation processing unit 3200 and the GPS positioning data outputted from the position information acquisition unit 3500. For example, even when the position of the vehicle included in the GPS positioning data is the same, if the attitude of vehicle is different due to the influence of a slope θ or the like on the ground, as shown in FIG. 36, the vehicle is regarded as travelling at a different position on the ground. Therefore, the accurate position of the vehicle cannot be calculated, simply based on the GPS positioning data. Thus, the position composition unit 3600 calculates which position on the ground the vehicle is travelling at, using the inertial navigation positioning data.

The position data outputted from the position composition unit 3600 is processed in a predetermined manner by the processing unit 3700 and the processed position data is displayed as the result of position measurement at the display unit 3900. The position data may also be transmitted to an external device by the communication unit 3800.

Tenth Embodiment

Figure 37:
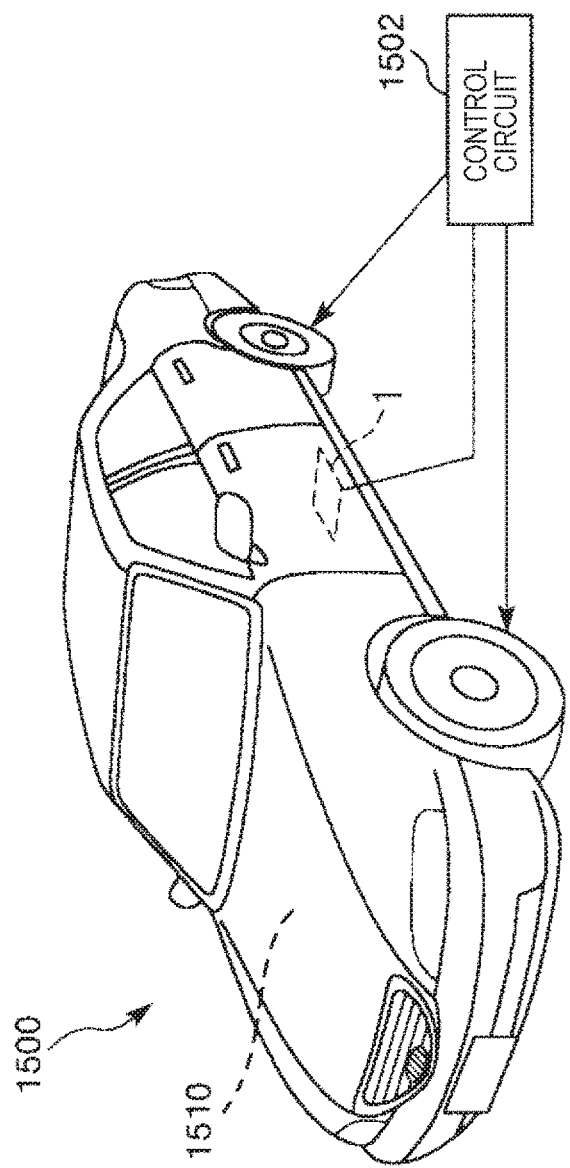
FIG. 37 is a perspective view showing a vehicle according to a tenth embodiment.

FIG. 37 is a perspective view showing a vehicle according to a tenth embodiment.

An automobile 1500 shown in FIG. 37 is an automobile to which the vehicle according to the present disclosure is applied. In this illustration, the automobile 1500 includes a system 1510 which is at least one of an engine system, a brake system, and a keyless entry system. The physical quantity sensor 1 is built in the automobile 1500 and can detect the attitude of the vehicle body. A detection signal from the physical quantity sensor 1 is supplied to a control circuit 1502. Based on the signal, the control circuit 1502 can control the system 1510.

In this way, the automobile 1500 as a vehicle has the physical quantity sensor 1 and the control circuit 1502 performing control based on a detection signal outputted from the physical quantity sensor 1. Therefore, the automobile 1500 has the effects of the physical quantity sensor 1 and achieves high reliability.

The physical quantity sensor 1 can also be broadly applied to a car navigation system, car air-conditioning, anti-lock braking system (ABS), airbags, tire pressure monitoring system (TPMS), engine control, and electronic control unit (ECU) such as battery monitor for hybrid car or electric vehicle. The vehicle is not limited to the automobile 1500. For example, a railway train, airplane, helicopter, rocket, artificial satellite, ship, AGV (automated guided vehicle), elevator, escalator, bipedal robot, unmanned aircraft such as drone, radio-controlled model, model train, toy or the like can be employed.

The physical quantity sensor, the electronic apparatus, and the vehicle according to the present disclosure have been described above, based on the illustrated embodiments. However, the present disclosure is not limited to these embodiments. The configuration of each part can be replaced by any configuration having a similar function. Also, any other component may be added to the present disclosure. Moreover, the foregoing embodiments may be suitably combined together.

In the embodiments, the configuration where the physical quantity sensor detects an acceleration is described. However, the physical quantity detected by the physical quantity sensor is not particularly limited and may be, for example, an angular velocity, pressure or the like.

What is claimed is:

1. A physical quantity sensor, where a first direction, a second direction, and a third direction are provided as three directions orthogonal to each other, comprising:
a substrate; and
a moving member facing the substrate in the third direction via a gap and becoming displaced in the third direction in relation to the substrate, the gap having a first gap, a second gap, a third gap, and a fourth gap, the second gap having a longer distance between the substrate and the moving member than the first gap, the first gap, the second gap, the third gap, and the fourth gap having different distances between the substrate and the moving member for the respective gap from each other, the moving member having a first part overlapping the first gap, a second part overlapping the second gap, a third part overlapping the third gap, and a fourth part overlapping the fourth gap as viewed in a plan view from the third direction, and a plurality of penetration holes arranged at the first part, the second part, the third part, and the fourth part, penetrating the moving member in the third direction, and having a square opening shape as viewed from the third direction, wherein in at least one of a first area overlapping the first part, a second area overlapping the second part, a third area overlapping the third part, and a fourth area overlapping the fourth part, as viewed in a plan view from the third direction, $C \leq 1.5 \times C\text{min}$, provided that $$C = 2aL\frac{8\mu H}{\beta^2 r_0^2}\left(1 + \frac{3r_0^4 K(\beta)}{16Hh^3}\right)\left[1 - \frac{l}{a}\tanh\left(\frac{a}{l}\right)\right] \quad (1)$$

$$l = \sqrt{\frac{2h^3 H_{\text{eff}} \eta(\beta)}{3\beta^2 r_0^2}}$$

$$H_{\text{eff}} = H + \frac{3\pi r_0}{8}$$

$$\eta(\beta) = 1 + \frac{3r_0^4 K(\beta)}{16Hh^3}$$

$$K(\beta) = 4\beta^2 - \beta^4 - 4\ln\beta - 3$$

$$\beta = \frac{r_0}{r_c}$$

$$r_c = \frac{S0 + S1}{\sqrt{\pi}}$$

$$r_0 = 0.547 \times S0,$$

where

H is a length of the penetration hole in the third direction,
a is half a length of the moving member along the first direction,
L is a length of the moving member along the second direction,
h is a length of the gap in the third direction,
S0 is a length of one side of the penetration hole,
S1 is a space between the penetration holes next to each other,
$\mu$ is a viscous resistance of a gas in the gap,
C is a damping generated in the moving member, and
C in the formula (1) is defined as Cmin when satisfying $$\frac{3r_0^4 K(\beta)}{16Hh^3} = 1.$$

2. A physical quantity sensor, where a first direction, a second direction, and a third direction are provided as three directions orthogonal to each other, comprising:

a substrate; and a moving member facing the substrate in the third direction via a gap and becoming displaced in the third direction in relation to the substrate, the gap having a first gap, a second gap, a third gap, and a fourth gap, the second gap having a longer distance between the substrate and the moving member than the first gap, the first gap, the second gap, the third gap, and the fourth gap having different distances between the substrate and the moving member for the respective gap from each other, the moving member having a first part overlapping the first gap, a second part overlapping the second gap, a third part overlapping the third gap, and a fourth part overlapping the fourth gap, as viewed in a plan view from the third direction, and a plurality of penetration holes arranged at the first part, the second part, the third part, and the fourth part, penetrating the moving member in the third direction, and having a circular opening shape as viewed from the third direction, wherein in at least one of a first area overlapping the first part, a second area overlapping the second part, a third area overlapping the third part, and a fourth area overlapping the fourth part, as viewed in a plan view from the third direction, $C \leq 1.5 \times C\text{min}$, provided that $$C = 2aL\frac{8\mu H}{\beta^2 r_0^2}\left(1 + \frac{3r_0^4 K(\beta)}{16Hh^3}\right)\left[1 - \frac{l}{a}\tanh\left(\frac{a}{l}\right)\right] \quad (1)$$

$$l = \sqrt{\frac{2h^3 H_{\text{eff}} \eta(\beta)}{3\beta^2 r_0^2}}$$

$$H_{\text{eff}} = H + \frac{3\pi r_0}{8}$$

$$\eta(\beta) = 1 + \frac{3r_0^4 K(\beta)}{16Hh^3}$$

$$K(\beta) = 4\beta^2 - \beta^4 - 4\ln\beta - 3$$

$$\beta = \frac{r_0}{r_c},$$

where

H is a length of the penetration hole in the third direction,
a is half a length of the moving member along the first direction,
L is a length of the moving member along the second direction,
h is a length of the gap in the third direction,
$r_0$ is a radius of the penetration hole,
$r_c$ is half a distance between centers of the penetration holes,
$\mu$ is a viscous resistance of a gas in the gap,
C is a damping generated in the moving member, and
C in the formula (1) is defined as Cmin when satisfying $$\frac{3r_0^4 K(\beta)}{16Hh^3} = 1.$$

3. A physical quantity sensor, where a first direction, a second direction, and a third direction are provided as three directions orthogonal to each other, comprising:

a substrate; and a moving member facing the substrate in the third direction via a gap and becoming displaced in the third direction in relation to the substrate, the gap having a first gap, a second gap, a third gap, and a fourth gap, the second gap having a longer distance between the substrate and the moving member than the first gap, the first gap, the second gap, the third gap, and the fourth gap having different distances between the substrate and the moving member for the respective gap from each other, the moving member having a first part overlapping the first gap, a second part overlapping the second gap, a third part overlapping the third gap, and a fourth part overlapping the fourth gap, as viewed in a plan view from the third direction, and a plurality of penetration holes arranged at the first part, the second part, the third part, and the fourth part, penetrating the moving member in the third direction, and having a polygonal opening shape as viewed from the third direction, wherein in at least one of a first area overlapping the first part, a second area overlapping the second part, a third area overlapping the third part, and a fourth area overlapping the fourth part, as viewed in a plan view from the third direction, $C \leq 1.5 \times Cmin$, provided that $$C = 2aL\frac{8\mu H}{\beta^2 r_0^2}\left(1 + \frac{3r_0^4 K(\beta)}{16Hh^3}\right)\left[1 - \frac{l}{a}\tanh\left(\frac{a}{l}\right)\right] \quad (1)$$

$$l = \sqrt{\frac{2h^3 H_{eff}\eta(\beta)}{3\beta^2 r_0^2}}$$

$$H_{eff} = H + \frac{3\pi r_0}{8}$$

$$\eta(\beta) = 1 + \frac{3r_0^4 K(\beta)}{16Hh^3}$$

$$K(\beta) = 4\beta^2 - \beta^4 - 4\ln\beta - 3$$

$$\beta = \frac{r_0}{r_c}$$

$$r_c = \frac{S0 + S1}{\sqrt{\pi}}$$

$$r_0 = 0.547 \times S0,$$

where

H is a length of the penetration hole in the third direction, a is half a length of the moving member along the first direction, L is a length of the moving member along the second direction, h is a length of the gap in the third direction, S0 is a square root of area of the penetration hole, S1 is a value of spaces between the penetration holes next to each other in the first direction and the second direction added together and divided by 2, μ is a viscous resistance of a gas in the gap, C is a damping generated in the moving member, and C in the formula (1) is defined as Cmin when satisfying $$\frac{3r_0^4 K(\beta)}{16Hh^3} = 1.$$

4. The physical quantity sensor according to claim 1, wherein
the formula (1) is satisfied at least in the first area.

5. The physical quantity sensor according to claim 1, wherein
the formula (1) is satisfied both in the first area and in the second area.

6. The physical quantity sensor according to claim 1, further comprising:
a fixed part fixed to the substrate; and
a support beam coupling the moving member and the fixed part together and forming a rotation axis along the first direction, wherein
the moving member is displaceable about the rotation axis, the moving member has a first mass part located at one side of the second direction in relation to the rotation axis, and a second mass part located at the other side and having a greater moment of rotation about the rotation axis than the first mass part, as viewed in a plan view from the third direction, and
the second mass part has a first part and a second part located at a more distant position from the rotation axis than the first part.

7. The physical quantity sensor according to claim 6, wherein
the first mass part has the first part, and
the first part of the first mass part and the first part of the second mass part are arranged symmetrically with each other about the rotation axis, as viewed in a plan view from the third direction.

8. The physical quantity sensor according to claim 1, wherein
in at least one of the first area and the second area, $C \leq 1.4 \times Cmin$.

9. The physical quantity sensor according to claim 8, wherein
in at least one of the first area and the second area, $C \leq 1.3 \times Cmin$.

10. The physical quantity sensor according to claim 9, wherein
in at least one of the first area and the second area, $C \leq 1.2 \times Cmin$.

11. The physical quantity sensor according to claim 1, wherein
in at least one of the first area and the second area, $0.25 \leq S1/S0 \leq 3.00$.

12. The physical quantity sensor according to claim 11, wherein
in at least one of the first area and the second area, $0.6 \leq S1/S0 \leq 2.40$.

13. The physical quantity sensor according to claim 12, wherein
in at least one of the first area and the second area, $0.8 \leq S1/S0 \leq 2.00$.

14. An electronic apparatus comprising:
the physical quantity sensor according to claim 1; and
a control circuit performing control based on a detection signal outputted from the physical quantity sensor.

15. A vehicle comprising:
the physical quantity sensor according to claim 1; and
a control circuit performing control based on a detection signal outputted from the physical quantity sensor.

* * * * *